(12) United States Patent
Yoshida

(10) Patent No.: US 11,599,309 B2
(45) Date of Patent: Mar. 7, 2023

(54) INFORMATION PROCESSING APPARATUS IMPROVED IN CONVENIENCE OF OPERATION OF SETTING SETTING ITEMS, METHOD OF CONTROLLING SAME, AND STORAGE MEDIUM

(71) Applicant: CANON KABUSHIKI KAISHA, Tokyo (JP)

(72) Inventor: Katsushi Yoshida, Niigata (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/542,305

(22) Filed: Dec. 3, 2021

(65) Prior Publication Data

US 2022/0197571 A1 Jun. 23, 2022

(30) Foreign Application Priority Data

Dec. 17, 2020 (JP) .............................. JP2020-209348

(51) Int. Cl.
*G06F 3/12* (2006.01)

(52) U.S. Cl.
CPC .......... *G06F 3/1204* (2013.01); *G06F 3/1255* (2013.01); *G06F 3/1257* (2013.01); *G06F 3/12* (2013.01)

(58) Field of Classification Search
CPC .... G06F 3/1204; G06F 3/1255; G06F 3/1257; G06F 3/1285; G06F 3/12

USPC ......................................................... 358/1.13
See application file for complete search history.

(56) References Cited

U.S. PATENT DOCUMENTS

| | | | |
|---|---|---|---|
| 6,349,304 B1* | 2/2002 | Boldt | G06F 15/177 707/999.102 |
| 2008/0055647 A1* | 3/2008 | Kotake | G06F 3/1285 358/1.16 |

FOREIGN PATENT DOCUMENTS

JP 4208908 B2 1/2009

* cited by examiner

*Primary Examiner* — Darryl V Dottin
(74) *Attorney, Agent, or Firm* — Venable LLP

(57) ABSTRACT

An information processing apparatus including a user interface unit that is operated so as to set settings of a plurality of setting items in the information processing apparatus. The information processing apparatus acquires information including settings of the plurality of setting items and determines whether or not a lock setting for inhibiting the plurality of setting items or a plurality of settings from being changed is included in the acquired information. In a case where it is determined that the lock setting is included, at least the plurality of setting items or the plurality of settings, associated with the lock setting, are inhibited from being change by operating the user interface unit.

8 Claims, 15 Drawing Sheets

FIG. 7

| AREA 1701 | | CONTENTS 1702 | |
|---|---|---|---|
| 1703 | PUBLIC MEMBER AREA | DOCUMENT SIZE (A4, A3, ETC.) | 1705 |
| | | NUMBER OF COPIES (1~9999) | 1706 |
| | | MAGNIFICATION (25%~200%) | 1707 |
| | | COLOR MODE (MONOCHROME, COLOR) | 1708 |
| 1704 | PRIVATE MEMBER AREA | COLOR SETTING PARAMETER RED DENSITY VALUE (−128~128) | 1709 |
| | | COLOR SETTING PARAMETER GREEN DENSITY VALUE (−128~128) | 1710 |
| | | COLOR SETTING PARAMETER BLUE DENSITY VALUE (−128~128) | 1711 |
| | | COLOR SETTING PARAMETER BRIGHTNESS (−128~128) | 1712 |
| | | COLOR SETTING PARAMETER CONTRAST (−128~128) | 1713 |
| | | COLOR SETTING PARAMETERS LOCK INFORMATION (0: LOCK OFF, 1: LOCK ON) | 1714 |
| | | LOGIN NAME (SMALL LETTER ONE-BYTE ALPHANUMERIC CHARACTERS (WITHIN 20 CHARACTERS)) | 1715 |
| | | DATE PRINTING POSITION (NONE, UPPER LEFT, UPPER CENTER, UPPER RIGHT, LOWER LEFT, LOWER CENTER, LOWER RIGHT) | 1716 |
| | | PAGE NUMBER PRINTING POSITION (NONE, UPPER LEFT, UPPER CENTER, UPPER RIGHT, LOWER LEFT, LOWER CENTER, LOWER RIGHT) | 1717 |
| | | FAVORITES (STANDARD SETTINGS SET, ETC.) | 1718 |
| | | OUTPUT SHEET SIZE (A4, A3, ETC.) | 1719 |
| | | PAGE LAYOUT (1 in 1, 2 in 1, ETC.) | 1720 |

| ADDRESS | SIZE (byte) | CONTENTS | |
|---|---|---|---|
| 0x0000 | 1 | COLOR SETTING PARAMETER RED DENSITY VALUE (-128~128) | ~1804 |
| 0x0001 | 1 | COLOR SETTING PARAMETER GREEN DENSITY VALUE (-128~128) | ~1805 |
| 0x0002 | 1 | COLOR SETTING PARAMETER BLUE DENSITY VALUE (-128~128) | ~1806 |
| 0x0003 | 1 | COLOR SETTING PARAMETER BRIGHTNESS (-128~128) | ~1807 |
| 0x0004 | 1 | COLOR SETTING PARAMETER CONTRAST (-128~128) | ~1808 |
| 0x0005 | 1 | COLOR SETTING PARAMETERS LOCK INFORMATION 0: LOCK OFF 1: LOCK ON | ~1809 |
| 0x0006 | 20 | LOGIN NAME SMALL LETTER ONE-BYTE ALPHANUMERIC CHARACTERS (WITHIN 20 CHARACTERS) | ~1810 |

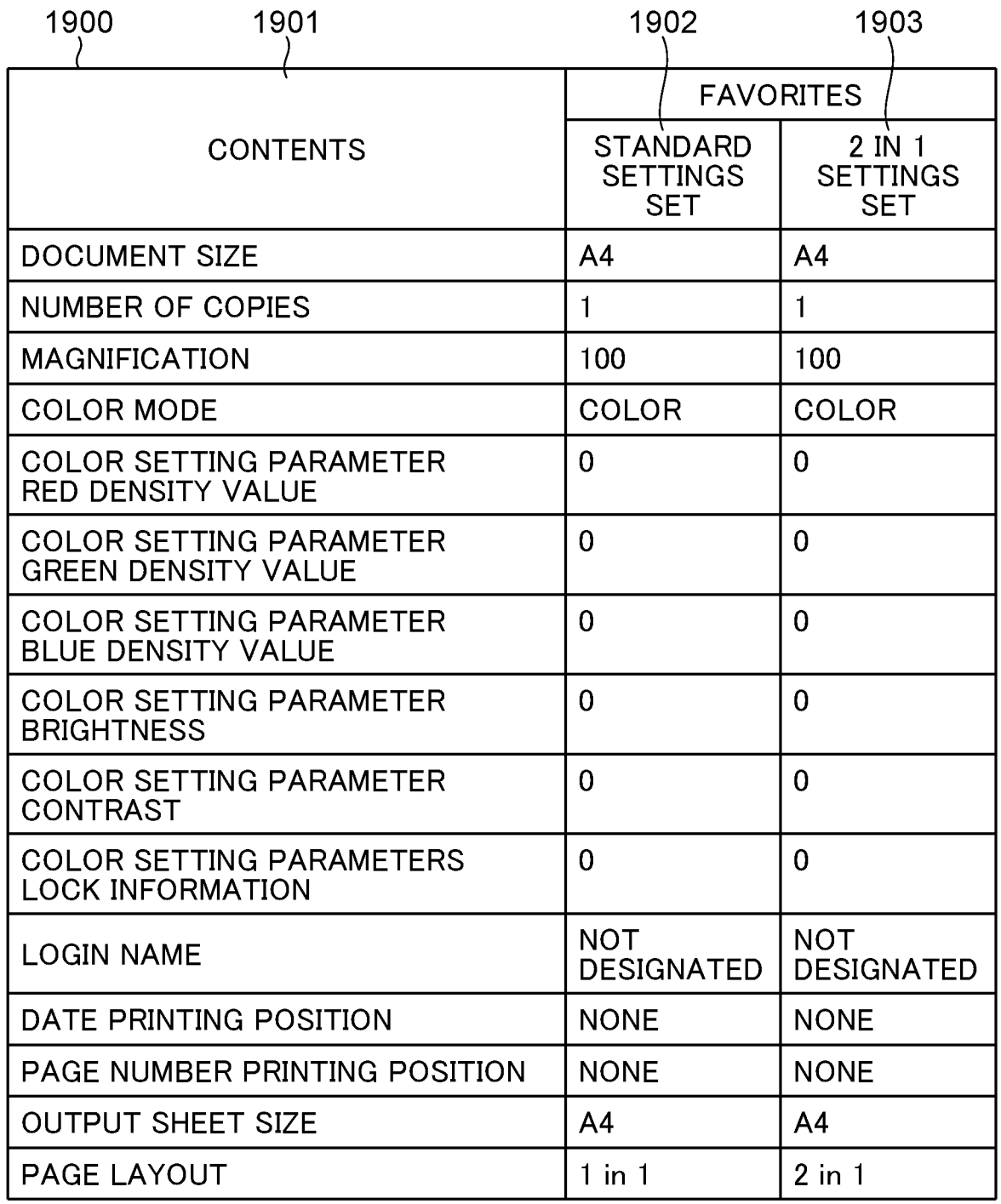

| CONTENTS | FAVORITES | |
|---|---|---|
| | STANDARD SETTINGS SET | 2 IN 1 SETTINGS SET |
| DOCUMENT SIZE | A4 | A4 |
| NUMBER OF COPIES | 1 | 1 |
| MAGNIFICATION | 100 | 100 |
| COLOR MODE | COLOR | COLOR |
| COLOR SETTING PARAMETER RED DENSITY VALUE | 0 | 0 |
| COLOR SETTING PARAMETER GREEN DENSITY VALUE | 0 | 0 |
| COLOR SETTING PARAMETER BLUE DENSITY VALUE | 0 | 0 |
| COLOR SETTING PARAMETER BRIGHTNESS | 0 | 0 |
| COLOR SETTING PARAMETER CONTRAST | 0 | 0 |
| COLOR SETTING PARAMETERS LOCK INFORMATION | 0 | 0 |
| LOGIN NAME | NOT DESIGNATED | NOT DESIGNATED |
| DATE PRINTING POSITION | NONE | NONE |
| PAGE NUMBER PRINTING POSITION | NONE | NONE |
| OUTPUT SHEET SIZE | A4 | A4 |
| PAGE LAYOUT | 1 in 1 | 2 in 1 |

1900  1901  1902  1903

INFORMATION PROCESSING APPARATUS IMPROVED IN CONVENIENCE OF OPERATION OF SETTING SETTING ITEMS, METHOD OF CONTROLLING SAME, AND STORAGE MEDIUM

BACKGROUND OF THE INVENTION

Field of the Invention

The present invention relates to an information processing apparatus that is improved in the convenience of operation of setting setting items, a method of controlling the same, and a storage medium.

Description of the Related Art

A computer apparatus is an example of an information processing apparatus. The computer apparatus is capable of executing a print process using an image processing apparatus, such as a printer. To perform the print process, it is required to set settings of a plurality of setting items related to functions and operations of the image processing apparatus, on the computer apparatus. Particularly, the plurality of setting items for the image processing apparatus include color settings, such as a setting of a color type, e.g. color or monochrome, and a setting of print layout. The color settings further include a plurality of setting items, such as color correction and color inversion. When using an information processing apparatus, a user is basically required to check the plurality of setting items on the information processing apparatus, one by one, and set a desired setting for each of the setting items. To reduce load on a user configuring the setting items, it is envisaged to configure the information processing apparatus such that the information processing is capable of storing user's favorite settings or the like, as disclosed in e.g. Japanese Patent No. 4208908. In the information processing apparatus, user information, such as a login name of a user who uses the information processing apparatus, may be stored in a state associated with the settings. In this case, the user can log into the information processing apparatus or read out favorite settings stored in the information processing apparatus, to thereby collectively set settings of a plurality of setting items by reusing the settings made in the information processing apparatus in the past.

Incidentally, when a situation where a user uses the information processing apparatus is considered, a plurality of information processing apparatuses are sometimes used depending on a user. In this case, it is desirable that the settings set by a user in a first information processing apparatus can be reused in a second information processing apparatus. With this, even when the information processing apparatus used by the user is changed between the plurality of information processing apparatuses, the user is not required to set the same settings of the plurality of setting items, one by one, for a new information processing apparatus. The user can execute the same printing or the like by the new information processing apparatus without being required to set the same settings of the plurality of setting items, one by one, for the new information processing apparatus. However, similar to the previously used information processing apparatus, when using the new information processing apparatus, there is a possibility that the user performs setting operation as usual by logging into the same. In this case, the settings of the plurality of setting items set for the new information processing apparatus are overwritten and updated by the user's operation. Therefore, in this case, the new information processing apparatus cannot execute processing using the settings set by the user for the previously-used information processing apparatus in advance.

Thus, there is a demand that the information processing apparatus is to be improved in the convenience of a user when performing the operation of setting a plurality of setting items while being secured that processing can be executed using the settings set by the user before using the information processing apparatus.

SUMMARY OF THE INVENTION

The present invention provides an information processing apparatus that is improved in the convenience of a user when performing an operation of setting a plurality of setting items while being secured that processing can be executed with the settings set by the user before using the information processing apparatus, a method of controlling the same, and a storage medium.

In a first aspect of the present invention, there is provided an information processing apparatus, including a user interface unit that is operated so as to set settings of a plurality of setting items in the information processing apparatus, at least one processor, and a memory coupled to the at least one processor, the memory having instructions that, when executed by the processor, perform the operations as: an acquisition unit configured to acquire information including settings of the plurality of setting items, a lock determination unit configured to determine whether or not a lock setting for inhibiting the plurality of setting items or a plurality of settings from being changed is included in the information acquired by the acquisition unit, and a control unit configured to inhibit, in a case where it is determined by the lock determination unit that the lock setting is included, at least the plurality of setting items or the plurality of settings, associated with the lock setting, from being changed by operating the user interface unit.

In a second aspect of the present invention, there is provided a method of controlling an information processing apparatus including a user interface unit that is operated so as to set settings of a plurality of setting items in the information processing apparatus, including acquiring information including settings of the plurality of setting items, determining whether or not a lock setting for inhibiting the plurality of setting items or a plurality of settings from being changed is included in the acquired information, and inhibiting, in a case where it is determined that the lock setting is included, at least the plurality of setting items or the plurality of settings, associated with the lock setting, from being changed by operating the user interface unit.

According to the present invention, it is possible to improve the convenience of a user when performing an operation of setting a plurality of setting items while being secured that processing can be executed with the settings set by the user before using the information processing apparatus.

Further features of the present invention will become apparent from the following description of exemplary embodiments (with reference to the attached drawings).

BRIEF DESCRIPTION OF THE DRAWINGS

FIG. 7 is an explanatory diagram of a data structure of stored data including settings of a plurality of setting items for printing, for the printer, which is managed and stored by a DEVMODE of the computer apparatus, appearing in FIG. 4.

FIG. 8 is an explanatory diagram of a data structure of a color setting file generated by the computer apparatus shown in FIG. 3 so as to collectively set color settings of another computer apparatus.

FIG. 11 is an explanatory diagram of contents of user's favorite settings, which are stored in the other computer apparatus.

DESCRIPTION OF THE EMBODIMENTS

The present invention will now be described in detail below with reference to the accompanying drawings showing embodiments thereof. However, the configurations of the following embodiment are described only by way of example, and are by no means intended to limit the scope of the present invention.

Figure 1:
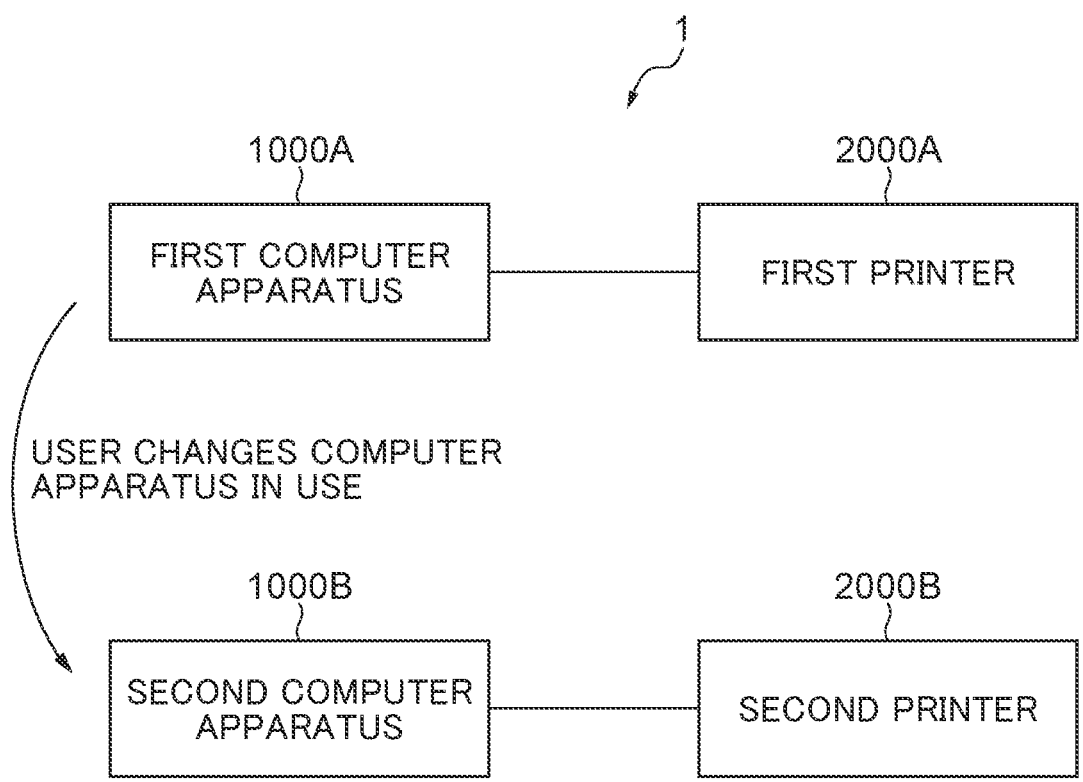
FIG. 1 is a diagram of the configuration of an image processing system including a plurality of computer apparatuses as a plurality of information processing apparatuses according to an embodiment of the present invention.

FIG. 1 is a diagram of the configuration of an image processing system 1 including computer apparatuses 1000 as a plurality of information processing apparatuses according to an embodiment of the present invention. The image processing system 1 shown in FIG. 1 includes a first computer apparatus 1000A, a first printer 2000A, a second computer apparatus 1000B, and a second printer 2000B. Note that when the first computer apparatus 1000A and the second computer apparatus 1000B are not distinguished from each other, they are described as the computer apparatuses 1000, and when the first printer 2000A and the second printer 2000B are not distinguished, they are described as the printers 2000. The first printer 2000A is communicably connected to the first computer apparatus 1000A. The second printer 2000B is communicably connected to the second computer apparatus 1000B. The computer apparatuses 1000 and the printers 2000 may be connected by using e.g. a USB cable or a wired network cable, or may be connected by using wireless communication.

For example, a user who uses the first computer apparatus 1000A sometimes uses the second computer apparatus 1000B e.g. due to another work or a change of the apparatus to be used. In this case, the user who used the first computer apparatus 1000A before desires to use the print settings e.g. for the printer 2000A also in the second computer apparatus 1000B which is newly used. To do this, the user is required to set the settings of a plurality of setting items for printing, on the second computer apparatus 1000B which is newly used.

Particularly, as the setting items for image processing, such as printing, which are required to set for the printer 2000, there are a plurality of setting items including a setting of a color type, such as color or monochrome, a setting of print layout, and so forth. The color settings further include a plurality of setting items, such as color correction and color inversion. To perform printing from the second computer apparatus 1000B, the user is basically required to confirm the plurality of setting items, one by one, and set a desired setting for each of the setting items on the second computer apparatus 1000B. This setting work is a burden for the user.

Note that in a case where the user uses the first computer apparatus 1000A or the second computer apparatus 1000B depending e.g. on a work, the user is also required to perform a setting operation for each computer apparatus 1000. For example, there is a case where the user performs confirmation and processing of an image for printing, on the first computer apparatus 1000A, and uses the second computer apparatus 1000B so as to perform printing using the second printer 2000B having high performance. In this case, the user is required to make the same settings for each of the computer apparatuses 1000.

Figure 2:
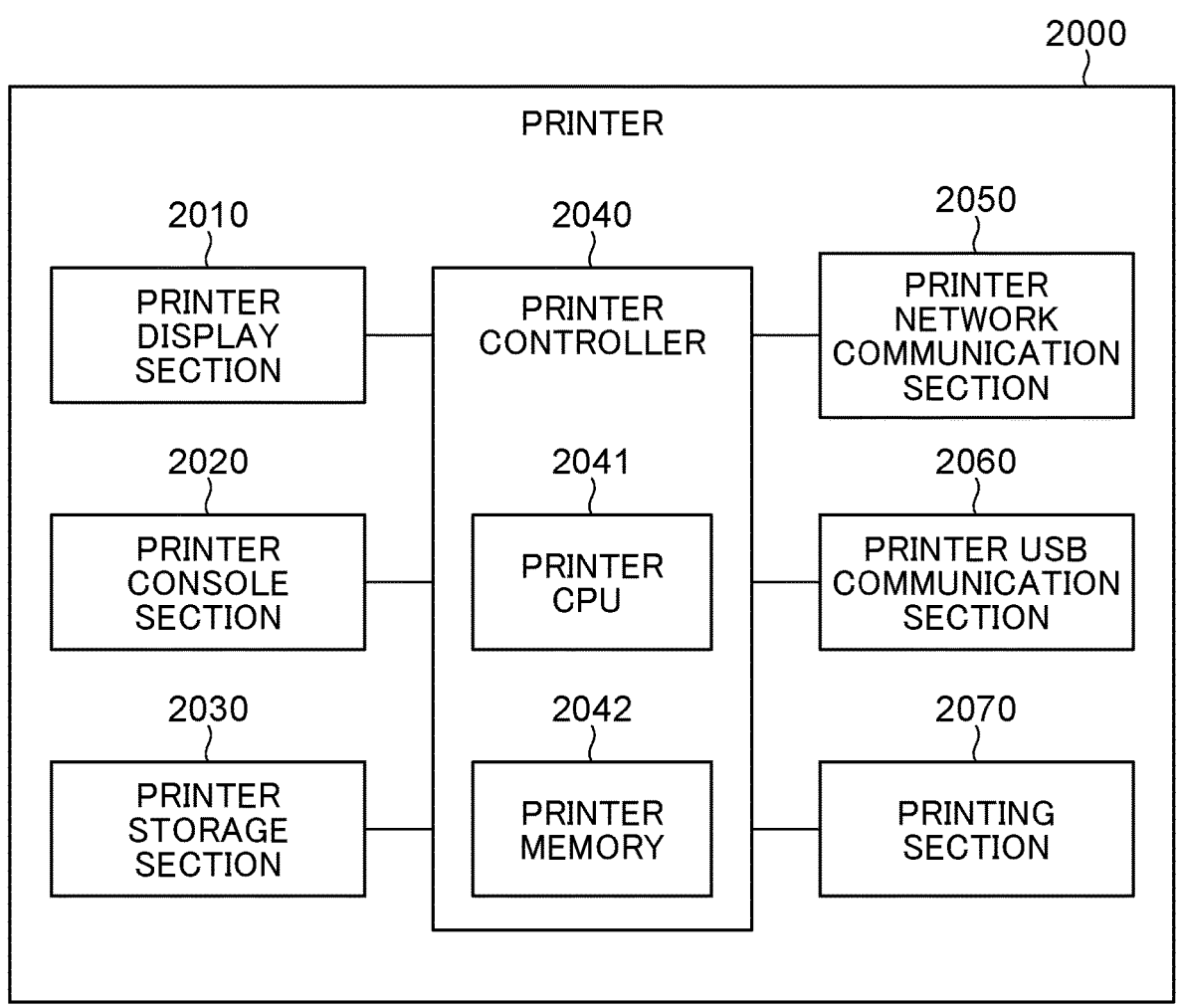
FIG. 2 is an explanatory diagram of the hardware configuration of a printer.

FIG. 2 is an explanatory diagram of the hardware configuration of the printer 2000. The first printer 2000A and the second printer 2000B, appearing in FIG. 1, may have the configuration shown in FIG. 2. The printer 2000 shown in FIG. 2 includes a printer display section 2010, a printer console section 2020, a printer storage section 2030, a printer network communication section 2050, a printer USB communication section 2060, a printing section 2070, and a printer controller 2040. The printer controller 2040 includes a printer CPU 2041 and a printer memory 2042. The CPU is an abbreviated form of the Central Processing Unit. The printer 2000 configured as above may function as an image processing apparatus.

The printer display section 2010 includes a liquid crystal panel that displays e.g. a setting screen. The printer console section 2020 includes e.g. a touch panel and a variety of buttons operated by a user. The touch panel detects a user operation performed on the liquid crystal panel. The printer display section 2010 and the printer console section 2020 function as a user interface unit of the printer 2000. A user can set the settings of the plurality of setting items on the printer 2000 by operating the printer display section 2010 and the printer console section 2020. To the printer network communication section 2050, for example, a wired cable is connected. The computer apparatus 1000 may be connected to the wired cable. The printer USB communication section 2060 is connected to another apparatus, such as the computer apparatus 1000, e.g. by a USB cable. The printer network communication section 2050 and the printer USB communication section 2060 receive print data and settings data e.g. from the computer apparatus 1000. The settings data may be received as part of the print data. The printer network communication section 2050 and the printer USB communication section 2060 transmit status data and settings data of the printer 2000 e.g. to the computer apparatus 1000. The printing section 2070 prints print data on a sheet or the like based on the print settings. As the printing method, an ink method, a toner method, and any other suitable method may be used.

The printer storage section 2030 includes a storage medium, such as a hard disk or an SSD. The printer storage section 2030 may be removable from the printer 2000. The printer memory 2042 is e.g. a semiconductor memory. The printer storage section 2030 and the printer memory 2042 store programs executed by the printer CPU 2041 and data. The stored data may include print data and settings data transmitted and received by the printer network communication section 2050 and the printer USB communication section 2060. The printer CPU 2041 reads and executes the programs stored in the printer storage section 2030 and the printer memory 2042. With this, the printer controller 2040 is realized in the printer 2000. The printer controller 2040 controls the overall operation of the printer 2000. For example, the printer controller 2040 sets the settings data received by the printer network communication section 2050 in the printing section 2070. The printer controller 2040 causes the printing section 2070 to print the print data received by the printer network communication section 2050. With this, the printer 2000 can print the print data generated in the computer apparatus 1000 on a sheet with the settings made in the computer apparatus 1000.

Figure 3:
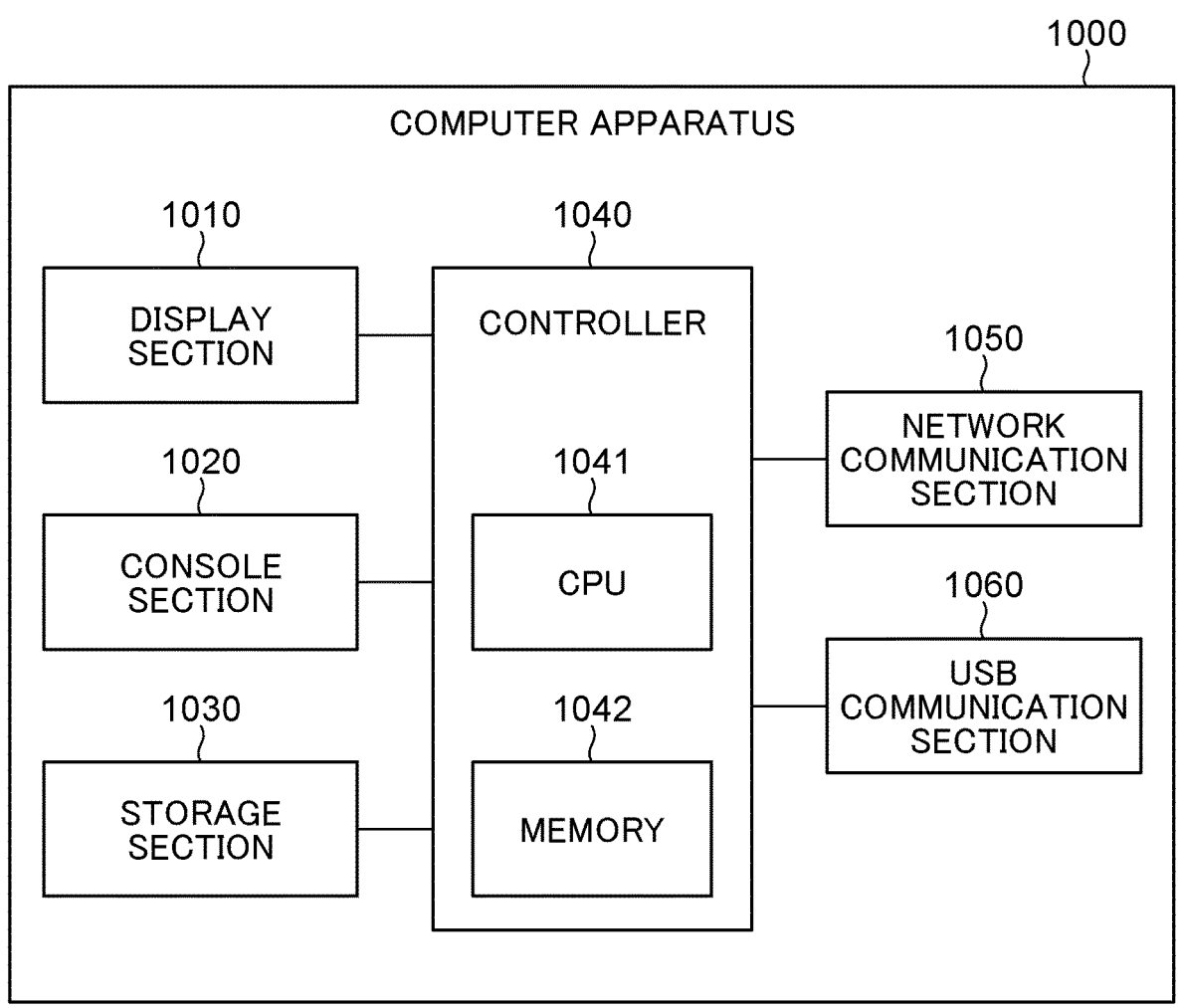
FIG. 3 is an explanatory diagram of the hardware configuration of a computer apparatus.

FIG. 3 is an explanatory diagram of the hardware configuration of the computer apparatus 1000. The first computer apparatus 1000A and the second computer apparatus 1000B, appearing in FIG. 1, may have the configuration shown in FIG. 3. The computer apparatus 1000 shown in FIG. 3 includes a display section 1010, a console section 1020, a storage section 1030, a network communication section 1050, a USB communication section 1060, and a controller 1040 to which these components are connected. The controller 1040 includes a CPU 1041 and a memory 1042. The computer apparatus 1000 configured as above is an example of the information processing apparatus.

The display section 1010 includes a large-sized liquid crystal panel that displays e.g. a setting screen. The console section 1020 includes e.g. a keyboard, a pointing device, a touch panel, and a variety of buttons operated by a user. The display section 1010 and the console section 1020 function as a user interface unit of the computer apparatus 1000. A user can set the settings of the plurality of setting items, which are used e.g. by the printer 2000, on the computer apparatus 1000, by operating the display section 1010 and the console section 1020. To the network communication section 1050, for example, a wired cable is connected. The printer 2000 may be connected to the wired cable. The USB communication section 1060 is connected to another apparatus, such as the printer 2000, e.g. by a USB cable. The network communication section 1050 and the USB communication section 1060 transmit print data and settings data e.g. to the printer 2000. The settings data may be transmitted as part of the print data.

The network communication section 1050 and the USB communication section 1060 receive status data and settings data of the printer 2000.

The storage section 1030 includes a storage medium, such as a hard disk or an SSD. The storage section 1030 may be removable from the computer apparatus 1000. The memory 1042 is e.g. a semiconductor memory. The storage section 1030 and the memory 1042 store programs executed by the CPU 1041 and data. The stored data may include print data and settings data transmitted and received by the network communication section 1050 and the USB communication section 1060. The CPU 1041 reads and executes the programs stored in the storage section 1030 and the memory 1042. With this, the controller 1040 as a control unit is realized in the computer apparatus 1000. The controller 1040 controls the overall operation of the computer apparatus 1000. For example, the controller 1040 displays an image to be printed by the printer 2000, on the display section 1010. The controller 1040 processes the image based on operations on the console section 1020 and generates settings data for the printer 2000, which is used to print the image. The controller 1040 may display a setting screen of a printer driver 1200 on the display section 1010 and generate the settings data for the printer 2000, which is used to print the image, based on operations on the console section 1020. The controller 1040 outputs the processed image data and the settings data for the printer 2000 to the network communication section 1050. The network communication section 1050 transmits the image data and the settings data to the printer 2000. With this, the computer apparatus 1000 can print the image processed in the computer apparatus 1000 on a sheet with the desired settings, using the printer 2000.

Figure 4:
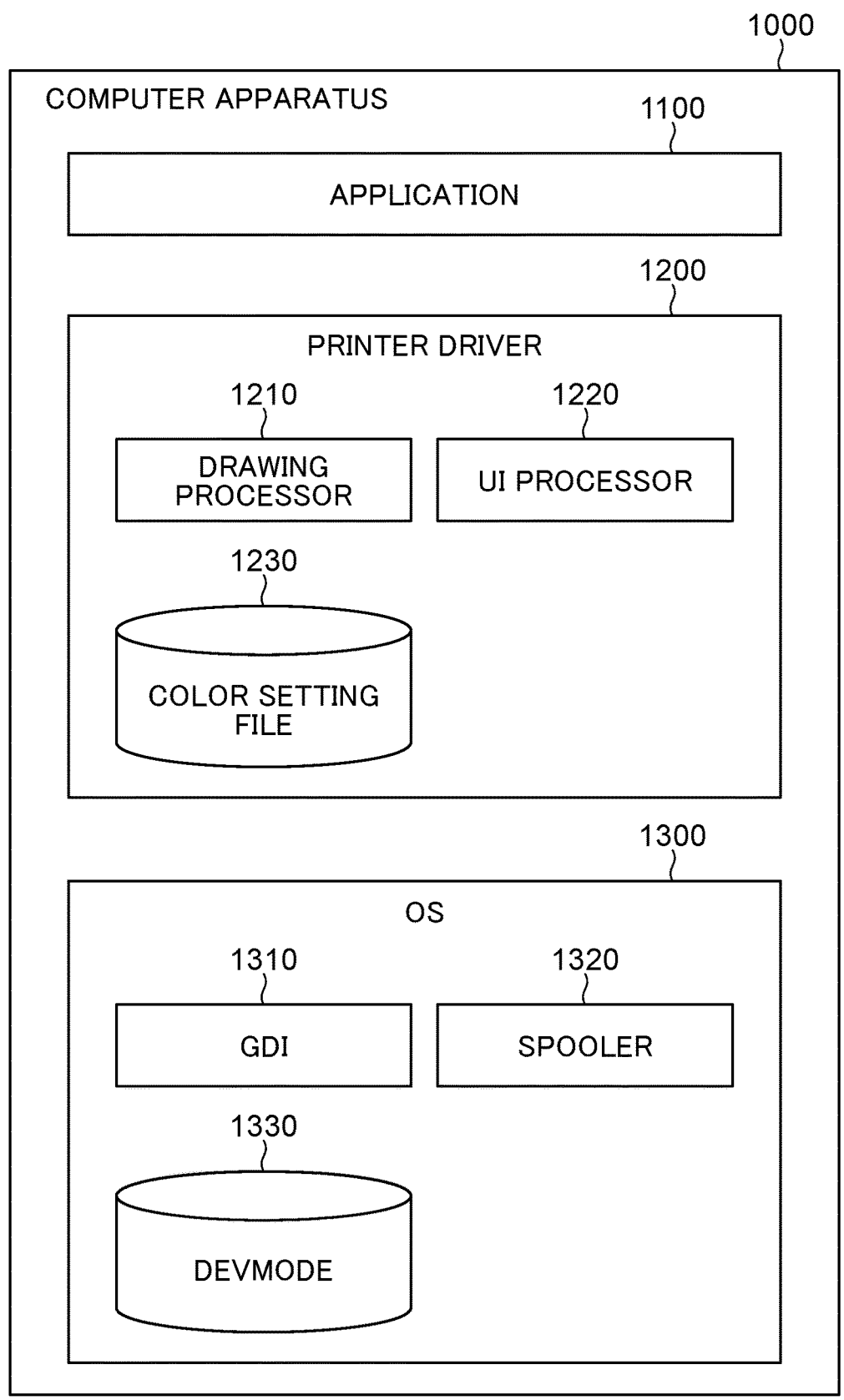
FIG. 4 is an explanatory diagram of configuration of software of the computer apparatus shown in FIG. 3.

FIG. 4 is an explanatory diagram of configuration of software of the computer apparatus 1010 shown in FIG. 3. The software of the computer apparatus 1000 shown in FIG. 4 is formed by modules related to printing and includes an application 1100, the printer driver 1200, and an OS 1300. These modules are realized in the computer apparatus 1000 that executes the programs by loading them from the storage section 1030 into the memory 1042.

The OS is an abbreviated form of the Operating System, and the OS 1300 controls the basic operation of the computer apparatus 1000. The application 1100 and the printer driver 1200 are installed and managed by the OS 1300. A GDI 1310 is a component of the OS 1300, for providing a drawing interface for the display on the display section 1010 and printing, to the outside. A spooler 1320 executes processing for transmitting print data to the printer 2000. A DEVMODE 1330 stores information of a plurality of setting items for printing, which are managed by the OS 1300. For example, the DEVMODE 1330 stores the settings of the plurality of setting items for printing, including color setting parameters stored in a color setting file 1230. The DEVMODE 1330 can store, in the storage section 1030, settings set by a user for a plurality of setting items e.g. of color for the printer 2000 used by the computer apparatus 1000, such that the settings can be collectively set. The application 1100 includes modules of functions used by a user, such as document creation and spreadsheet, of the computer apparatus 1000. A module of the application 1100 provides a function of printing a created document or the like. A screen for checking a print function made available by the application 1100 is displayed on the display section 1010, whereby a user can confirm a state of a created document or the like assumed to be printed on a sheet. The user can set a printed state for a created document or the like by operating the print settings prepared by the application 1100.

The printer driver 1200 is installed in the computer apparatus 1000 in association with the printer 2000 used by the computer apparatus 1000. The printer driver 1200 may be commonly usable by the plurality of printers 2000. A UI processor 1220 displays a print setting screen 1400 on the display section 1010. The UI processor 1220 acquires an operation performed by a user on the print setting screen 1400 from the console section 1020 and changes print settings. The UI processor 1220 displays a print execution confirmation screen on the display section 1010. The UI processor 1220 acquires an operation performed by the user on the print execution confirmation screen from the console section 1020 and executes printing. The UI processor 1220 generates drawing data (Page Description Language (PDL) data) interpretable by the printer 2000. A drawing processor 1210 is used when generating PDL data. Further, the printer driver 1200 of the present embodiment has a function of exporting and importing the color setting parameters included in the current print settings to and from the color setting file 1230. The UI processor 1220 displays the above-described operation screens on the display section 1010 and executes processing for exporting or importing the color setting file 1230 based on an operation performed on an associated one of the operation screens. In a case where the color setting file 1230 is exported, the CPU 1041 as the printer driver 1200 generates or updates the color setting file 1230 using information, such as the settings of the plurality of setting items for printing, currently held by the DEVMODE 1330. In a case where the color setting file 1230 is imported, the CPU 1041 as the printer driver 1200 collectively updates the information held by the DEVMODE 1330 using information included in the color setting file 1230, such as the settings of the plurality of setting items for printing.

Figure 5:
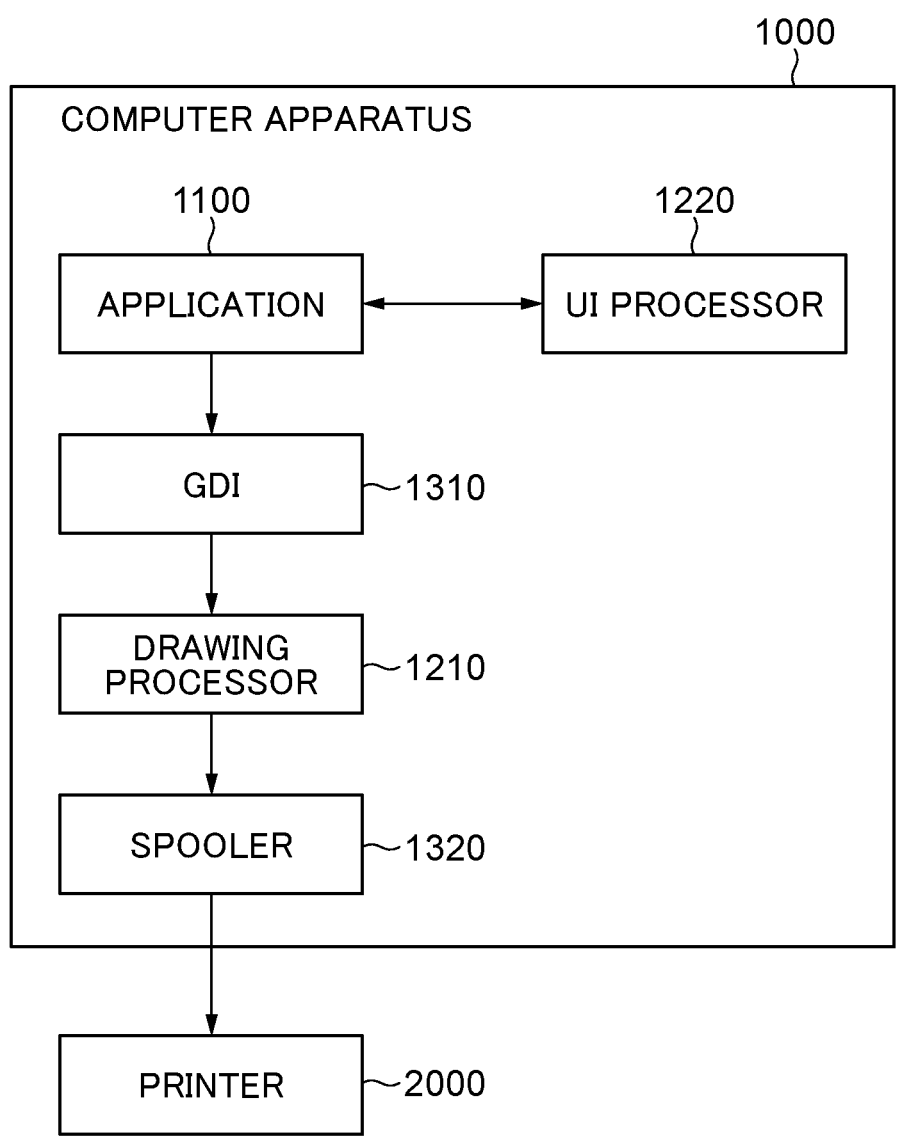
FIG. 5 is a diagram useful in explaining a flow of a print process performed by the software of the computer apparatus shown in FIG. 4.

FIG. 5 is a diagram useful in explaining a flow of a print process performed by the software of the computer apparatus 1000 shown in FIG. 4. The application 1100 calls the UI processor 1220 of the printer driver 1200 and causes a user to input print settings before execution of the print process. The user manipulates print settings using the user interface provided by the UI processor 1220 such that e.g. an image or text to be printed by the application 1100 are printed as desired. The application 1100 outputs a print drawing command to the GDI 1310 with the print settings acquired from the UI processor 1220. At this time, the application 1100 may call the GDI 1310 of the printer driver 1200 and place the GDI 1310 in an execution waiting state. The GDI 1310 converts the print drawing command acquired based on the print settings and the drawing command to a command interpretable by the printer driver 1200 and outputs the converted command to the drawing processor 1210. At this time, the GDI 1310 may call the drawing processor 1210 and sets the drawing processor 1210 in an execution waiting state. The drawing processor 1210 converts the command acquired from the GDI 1310 based on the print settings and the drawing command to PDL data interpretable by the printer 2000 and outputs the converted command to the spooler 1320. The spooler 1320 transmits the acquired PDL data to the printer 2000. Upon acquisition of new PDL data, the printer 2000 converts the PDL data to image data and executes printing on a sheet using the printing section 2070. Note that the modules shown in FIG. 5 are realized by the CPU 1041 of the computer apparatus 1000 that executes programs associated with the respective modules.

Figure 6A:
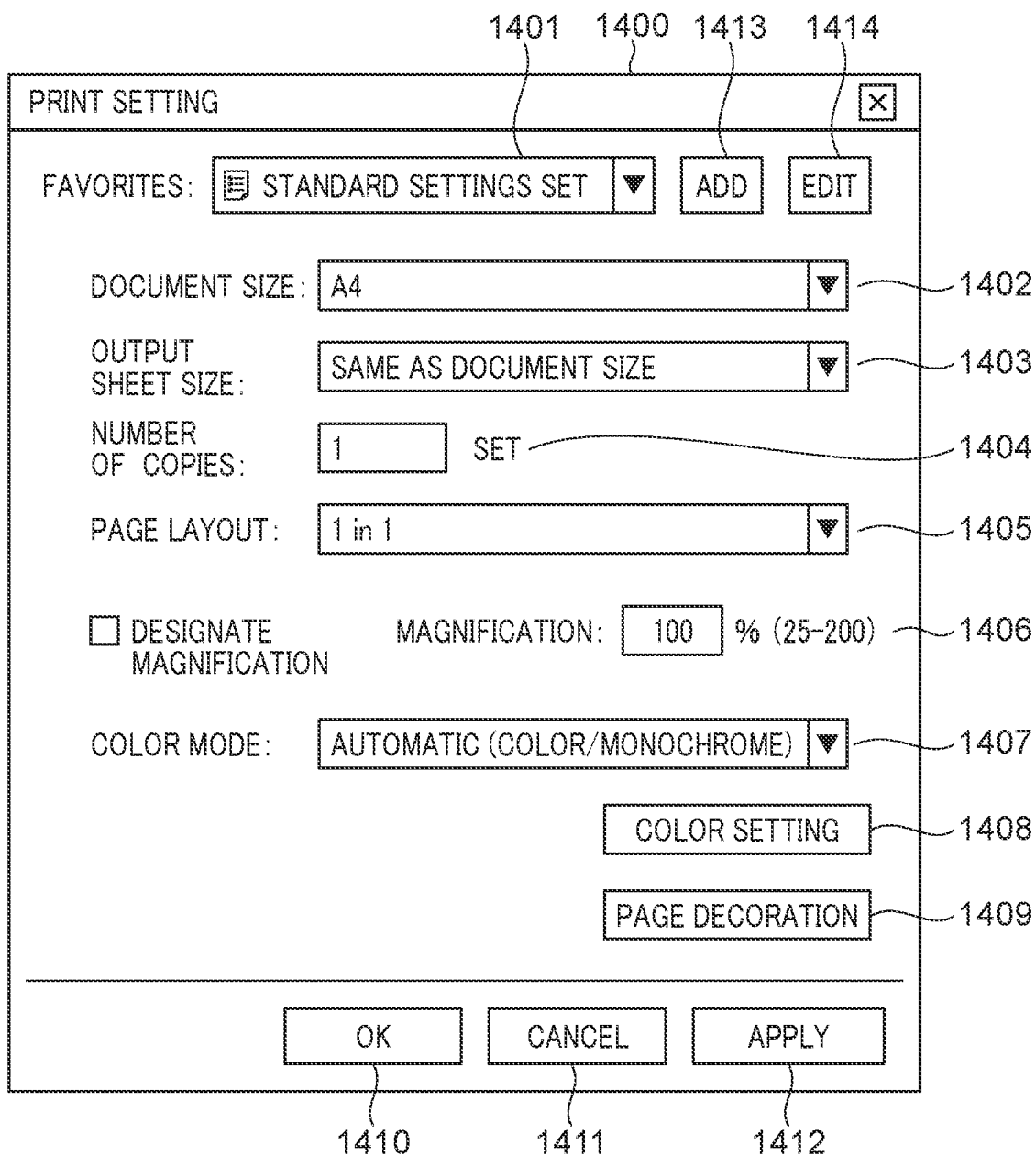
FIG. 6A is an explanatory diagram of a print setting screen of a printer driver, which is operably displayed on the computer apparatus shown in FIG. 3.

FIG. 6A is an explanatory diagram of the print setting screen 1400 of the printer driver 1200, which is operably displayed on the computer apparatus 1000 shown in FIG. 3. The UI processor 1220 of the printer driver 1200 displays the print setting screen 1400 shown in FIG. 6A on the display section 1010 such that the print setting screen 1400 is operable using the console section 1020. On the print setting screen 1400 shown in FIG. 6A, a plurality of display objects are displayed such that the display objects are selectable and settable by a user operation of the console section 1020. The plurality of display objects include, for example, favorites 1401, document size 1402, output sheet size 1403, number of copies 1404, page layout 1405, magnification 1406, color mode 1407, color setting button 1408, and page decoration button 1409. Current settings of associated setting items for printing are assigned to the display objects, respectively. In a case where the setting screen 1400 is called from a setting screen of the OS 1300, default settings are assigned to the plurality of display objects. In a case where the setting screen 1400 is called from a setting screen of the application 1100, the settings which have already been set on the setting screen displayed by the application 1100 may be assigned to the plurality of display objects. Further, the print setting screen 1400 shown in FIG. 6A displays an OK button 1410, a cancel button 1411, and an apply button 1412.

The display object of document size 1402 displays a setting of the size of document data of a print source such that the setting is selectable according to a size of a sheet. The application 1100 generates the document data of the print source at the size of a sheet selected as document size 1402.

The display object of output sheet size 1403 selectably displays a setting of the size of an output sheet on which the printer 2000 is to actually print. In the illustrated example in FIG. 6A, "the same size as the document size" is set. When a specific output sheet size other than this is selected and set, the printer driver 1200 or the printer 2000 executes scaling for converting the size of the document data of the print source to the size of the output sheet. The display object of number of copies 1404 displays a setting of number of copies 1404 to print the document data such that the setting can be set by number of copies 1404. The display object of page layout 1405 displays a setting associated with the number of pages of the document data to be printed on one output sheet such that the setting can be set by the number of pages. In the illustrated example in FIG. 6A, "1 in 1" is set. When the number of pages other than this is set, the printer driver 1200 or the printer 2000 executes scaling such that the designated number of pages of the document data of the print source is printed in one output sheet. The display object of magnification 1406 displays a setting of a document magnification/reduction ratio such that the setting can be set by a value of magnification 1406. In the illustrated example in FIG. 6A, "100%" is set. When a value of magnification 1406 other than this is set, the printer driver 1200 or the printer 2000 executes processing for enlarging/reducing the document data of the print source at the designated magnification 1406.

The display object of color mode 1407 selectably displays a setting of color mode 1407 for printing document data. In the illustrated example in FIG. 6A, the setting is set to perform "automatic selection" based on color components of the document data. In a case where color document data is printed in monochrome, "monochrome" is selected. When the display object of color setting button 1408 is selected for operation, the UI processor 1220 displays a color setting screen 1500, shown in FIG. 6B, on the display section 1010 such that the color setting screen 1500 is operable using the console section 1020. When the display object of page decoration button 1409 is selected for operation, the UI processor 1220 displays a page decoration-setting screen 1600, shown in FIG. 6C, on the display section 1010 such that the page decoration-setting screen 1600 is operable using the console section 1020. The display object of favorites 1401 is selected when setting settings of a plurality of setting items, which were set and stored by a user in advance. The UI processor 1220 reads one of sets of favorite settings, which is selected e.g. from a table of sets of favorite settings shown in FIG. 11, and collectively updates the settings of the setting items. The favorite settings usually include a plurality of settings set on the print setting screen 1400, a plurality of settings set on the color setting screen 1500, and a plurality of settings set on the page decoration-setting screen 1600. In this case, the UI processor 1220 collectively sets these settings. An addition button 1413 is a button for adding a new set of favorite settings to the table shown in FIG. 11. After setting settings which the user desires to register by operating the setting screen 1400 shown in FIG. 6A, when the user selects the addition button 1413, a new favorite setting screen is displayed. The user performs a registration operation, such as an operation for setting a name of the set of favorite settings to be registered, on the displayed favorite setting screen. An edit button 1414 is for editing contents of the set of favorite settings selected from favorites 1401. By the user selecting a set of favorite settings desired to edit and selecting the edit button 1414 after changing settings in FIG. 6A, the settings of the selected set of favorite settings in the table shown in FIG. 11 are updated. When the display object of the OK button 1410 is selected for operation, the UI processor 1220 stores the settings of the plurality of setting items for printing, which are displayed on the print setting screen 1400 shown in FIG. 6A, and closes the print setting screen 1400. When the display object of the cancel button 1411 is selected for operation, the UI processor 1220 discards the plurality of settings changed on the print setting screen 1400 shown in FIG. 6A and closes the print setting screen 1400. When the display object of the apply button 1412 is selected for operation, the UI processor 1220 stores the plurality of settings displayed on the print setting screen 1400 shown in FIG. 6A. In this case, the print setting screen 1400 shown in FIG. 6A is held in the opened state. Thus, the user can designate desired print settings by operating the print setting screen 1400 using the console section 1020.

Figure 6B:
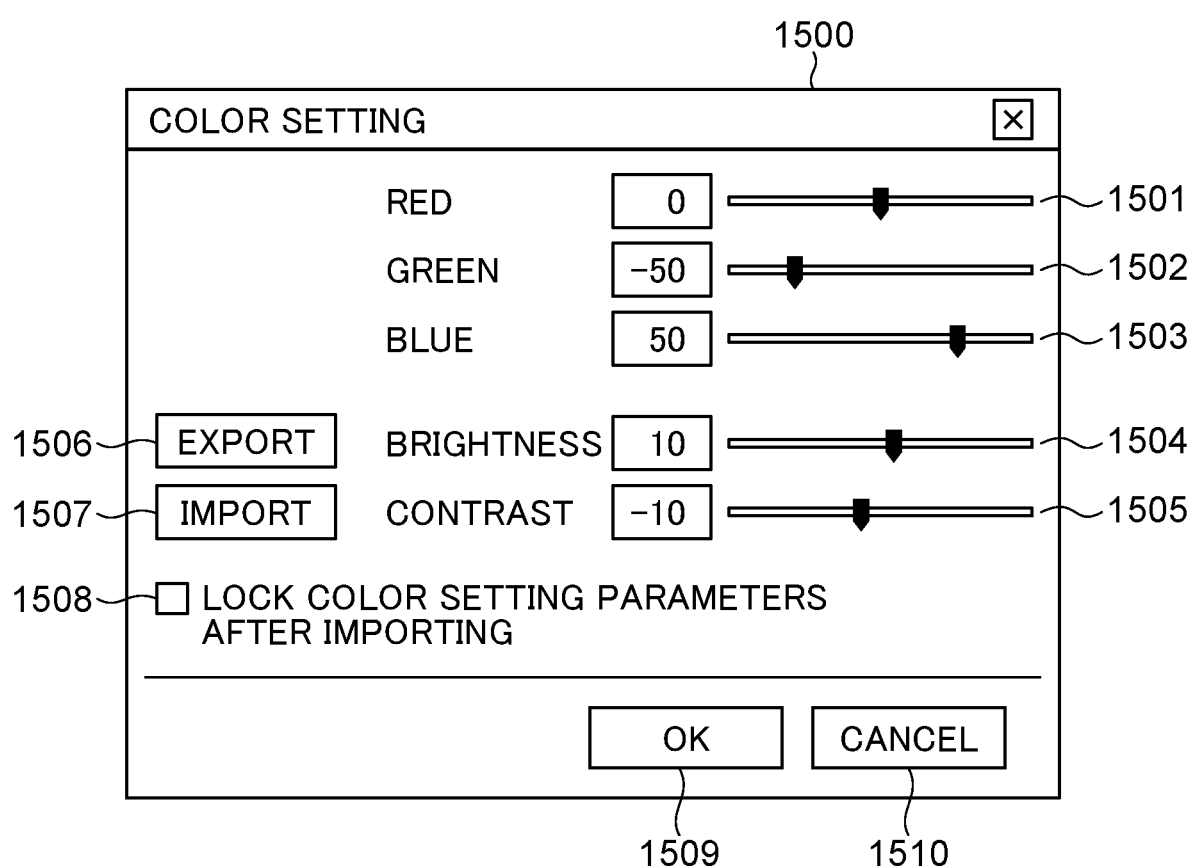
FIG. 6B is an explanatory diagram of a setting screen for setting color settings of the printer driver, which is operably displayed on the computer apparatus shown in FIG. 3.

FIG. 6B is an explanatory diagram of the color setting screen 1500 of the printer driver 1200, which is operably displayed on the computer apparatus 1000 shown in FIG. 3. The UI processor 1220 of the printer driver 1200 displays the color setting screen 1500, shown in FIG. 6B, on the display section 1010 such that the color setting screen 1500 is operable using the console section 1020 during the print process in FIG. 5. On the color setting screen 1500, shown in FIG. 6B, a plurality of display objects are displayed such that the display objects are selectable and changeable by a user operation on the console section 1020. The plurality of display objects include a plurality of slide bars 1501 to 1505 for manipulating e.g. RGB primary colors, brightness, and contrast, an export button 1506, an import button 1507, and a check box 1508. Current settings of associated setting items for printing are assigned to the display objects. In a case where the color setting screen 1500 is called from the setting screen of the OS 1300, default settings are assigned to the plurality of display objects. In a case where the color setting screen 1500 is called from the setting screen of the application 1100, settings which have already been set on the setting screen displayed by the application 1100 may be assigned to the plurality of display objects. Further, the color setting screen 1500 shown in FIG. 6B displays an OK button 1509 and a cancel button 1510.

When a slider on the display object of the slide bar 1501 of the red color is operated in a left-right direction, the UI processor 1220 increases or decreases the setting indicating the intensity of the red color according to a moving position of the slider and stores the changed setting. When a slider on the display object of the slide bar 1502 of the green color is operated in the left-right direction, the UI processor 1220 increases or decreases the setting indicating the intensity of the green color according to a moving position of the slider and stores the changed setting. When a slider on the display object of the slide bar 1503 of the blue color is operated in the left-right direction, the UI processor 1220 increases or decreases the setting indicating the intensity of the blue color according to a moving position of the slider and stores the changed setting. When a slider on the display object of the slide bar 1504 of brightness is operated in the left-right direction, the UI processor 1220 increases or decreases the setting indicating the intensity of brightness according to a moving position of the slider and stores the changed setting. When a slider on the display object of the slide bar 1505 of contrast is operated in the left-right direction, the UI processor 1220 increases or decreases the setting indicating the intensity of contrast according to a moving position of the slider and stores the changed setting. Note that a slide bar may be added to increase/decrease a setting associated with an image quality other than the above-mentioned setting items. Further, the RGB primary colors, brightness, or contrast may be set using display objects other than the slide bars 1501 to 1505. The user can print an image at a desired delicate color tone by adjusting these settings of the color setting items.

When the display object of the export button 1506 is selected for operation, the UI processor 1220 acquires settings of the plurality of color setting items on the color setting screen 1500, and exports and stores the acquired settings in the color setting file 1230. For example, the UI processor 1220 may display a dialog, not shown, for designating a color setting file 1230, and store the current settings of the plurality of color setting items in the color setting file 1230 in an export destination selected on the dialog. In a case where the color setting file 1230 does not exist in the export destination, the UI processor 1220 may newly generate a color setting file 1230. In a case where the color setting file 1230 exists in the export destination, the UI processor 1220 may overwrite the information of the color setting file 1230 with the current settings of the plurality of color setting items.

When the display object of the import button 1507 is selected for operation, the UI processor 1220 acquires settings of the plurality of color setting items in the color setting file 1230 and sets the acquired settings in the color setting screen 1500. For example, the UI processor 1220 may display a dialog, not shown, for designating a color setting file 1230, and acquire settings of the plurality of color setting items in the color setting file 1230 in an import source selected on the dialog. With this, the UI processor 1220 can restore the color settings in the self-computer apparatus 1000 by acquiring the color settings generated e.g. in the other computer apparatus 1000 from the color setting file 1230.

The check box 1508 is used for selecting whether or not to lock the settings of the plurality of color setting items to the contents of the color setting file 1230 after importing the color settings. In a case where the check box 1508 is checked, the UI processor 1220 locks the settings of the plurality of color setting items to inhibit the update of the plurality of locked settings. Here, the word "lock" is intended to mean that settings are fixed and prevented from being edited and changed by a UI operation. By checking the check box 1508, it is possible to lock the settings of the plurality of color setting items after importing the color settings, even in a case where a lock setting is not included in the color setting file 1230. Note that the color setting screen 1500, shown in FIG. 6B, is not necessarily required to include the check box 1508. In this case, the UI processor 1220 may necessarily lock the settings of the plurality of color setting items after importing the color settings.

When the display object of the OK button 1509 is selected for operation, the UI processor 1220 stores settings of the plurality of setting items for printing, which are displayed on the color setting screen 1500 shown in FIG. 6B, and closes the color setting screen 1500. When the display object of the cancel button 1510 is selected for operation, the UI processor 1220 discards the plurality of settings changed on the color setting screen 1500 shown in FIG. 6B, and closes the color setting screen 1500. When the color setting screen 1500 shown in FIG. 6B is closed, the display section 1010 displays the print setting screen 1400 shown in FIG. 6A. Thus, the user can select and set the settings of the plurality of color setting items on the color setting screen 1500 shown in FIG. 6B, and store the color settings by operating the OK button 1509.

Figure 6C:
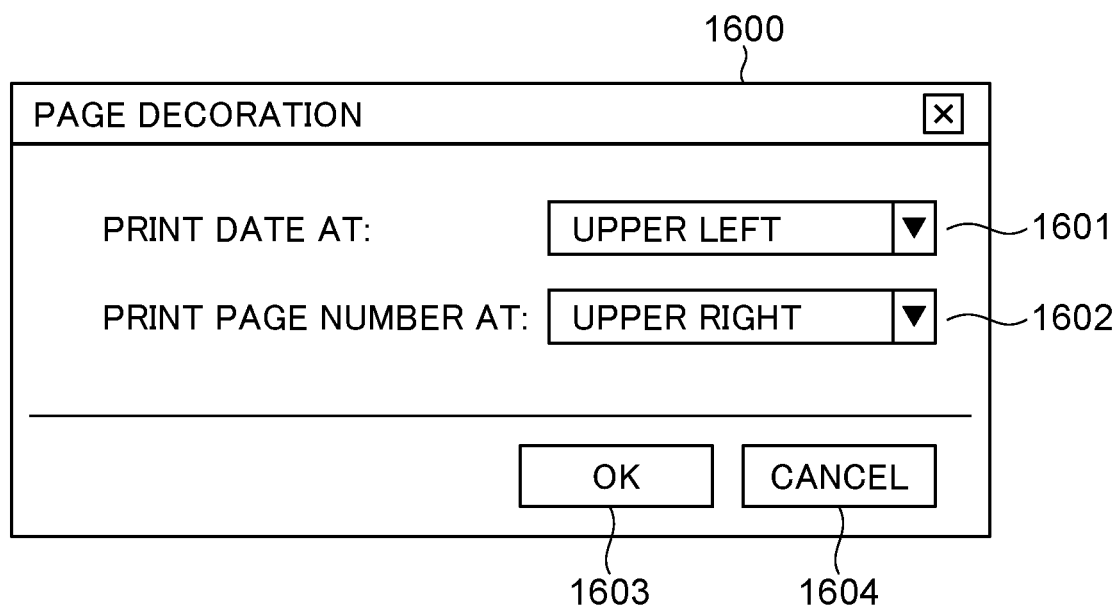
FIG. 6C is an explanatory diagram of a page decoration-setting screen of the printer driver, which is operably displayed on the computer apparatus shown in FIG. 3.

FIG. 6C is an explanatory diagram of the page decoration-setting screen 1600 of the printer driver 1200, which is operably displayed on the computer apparatus 1000 shown in FIG. 3. The UI processor 1220 of the printer driver 1200 displays the page decoration-setting screen 1600 shown in FIG. 6C on the display section 1010 such that the page decoration-setting screen 1600 is operable using the console section 1020 during the print process in FIG. 5. The page decoration-setting screen 1600 shown in FIG. 6C displays a plurality of display objects such that the display objects are selectable and changeable by a user operation on the console section 1020. As the plurality of display objects, a date printing position selection box 1601 and a page number printing position selection box 1602 are displayed. Current settings of the associated setting items for printing are assigned to the display objects. In a case where the setting screen 1600 is called from the setting screen of the OS 1300, default settings for printing are assigned to the plurality of display objects. In a case where the setting screen 1600 is called from the setting screen of the application 1100, settings which have already been set on the setting screen displayed by the application 1100 may be assigned to the plurality of display objects. Further, the page decoration-setting screen 1600 shown in FIG. 6C displays an OK button 1603 and a cancel button 1604.

The display object of the date printing position selection box 1601 selectably displays a setting of the printing position of the date on an output sheet. In the illustrated example in FIG. 6C, "upper left" is set. Examples of the date printing position include, besides this position, lower left, upper right, lower right, upper center, lower center, and so forth. The display object of the page number printing position selection box 1602 selectably displays a setting of the printing position of the page number on an output sheet. In the illustrated example in FIG. 6C, "upper right" is set.

Examples of the page number printing position includes, besides this position, upper left, lower left, lower right, upper center, lower center, and so forth. When the display object of the OK button 1603 is selected for operation, the UI processor 1220 stores the settings of the plurality of setting items for printing, displayed on the page decoration-setting screen 1600 shown in FIG. 6C, and closes the page decoration-setting screen 1600. When the display object of the cancel button 1604 is selected for operation, the UI processor 1220 discards the plurality of settings changed on the page decoration-setting screen 1600 shown in FIG. 6C, and closes the page decoration-setting screen 1600. When the page decoration-setting screen 1600 shown in FIG. 6C is closed, the display section 1010 displays the print setting screen 1400 shown in FIG. 6A. Thus, the user can select and set the settings of the plurality of setting items associated with page decoration on the page decoration-setting screen 1600 shown in FIG. 6C, and store the page decoration settings by operating the OK button 1603.

Note that in the present embodiment, the settings of the plurality of color setting items, which are selected and set on the color setting screen 1500 shown in FIG. 6B, are exported to the color setting file 1230 as information, or imported from the color setting file 1230. The UI processor 1220 may export the settings of the plurality of setting items associated with other than color to the color setting file 1230 as information or import the settings from the color setting file 1230. For example, the UI processor 1220 may export the settings of the plurality of setting items associated with page decoration, which are selected and set on the page decoration-setting screen 1600 shown in FIG. 6C, to the color setting file 1230 as information or import the settings from the color setting file 1230.

FIG. 7 is an explanatory diagram of a data structure of stored data 1700 including the settings of the plurality of setting items for printing by the printer 2000, which is managed and stored by the DEVMODE 1330 of the computer apparatus 1000 appearing in FIG. 4. The stored data 1700 shown in FIG. 7 may be recorded e.g. in the storage section 1030 of the computer apparatus 1000. The settings of the plurality of setting items for printing, which are set on the print setting screen 1400 shown in FIG. 6A, the color setting screen 1500 shown in FIG. 6B, and the page decoration-setting screen 1600 shown in FIG. 6C are recorded in the stored data 1700 shown in FIG. 7. The OS 1300 records all of the settings of the plurality of setting items for printing by the printer 2000, in the stored data 1700 shown in FIG. 7. The DEVMODE 1330 is a structure body for managing print settings, which is generally used in a main operating system of Microsoft Corporation. The stored data 1700 managed by the DEVMODE 1330 has a public member area 1703 and a private member area 1704 under the column of area 1701. The public member area 1703 is an area defined by the OS 1300 in advance and is formed by fixed members. In the present embodiment, the setting items, such as document size 1705, number of copies 1706, magnification 1707, and color mode 1708, are set as the members of the public member area 1703. These members are entered in rows under the column of contents 1702, which are associated with the public member area 1703.

The private member area 1704 is an expanded area made available for a vendor and is formed by vendor-specific members. In the present embodiment, the plurality of setting items set on the color setting screen 1500, some of the setting items set on the print setting screen 1400, and all of the setting items set on the page decoration-setting screen 1600 are set as the members of the private member area 1704. These members are entered in rows under the column of contents 1702, which are associated with the private member area 1704. For example, the members of color settings in the private member area 1704 include color setting parameters 1709 to 1713, color setting parameters lock information 1714, and login name 1715. The color setting parameters 1709 to 1713 are expressed in values of increase (plus)/decrease (minus) from respective center values (0) thereof. The members of the some of the setting items set on the print setting screen 1400 include favorites 1718, output sheet size 1719, and page layout 1720. The members of all of the setting items set on the page decoration-setting screen 1600 include date printing position 1716 and page number-printing position 1717. Here, the color setting parameters lock information 1714 is a setting indicating whether the lock setting for the color setting parameters 1709 to 1713 is enabled or disabled. When the color setting parameters lock information 1714 is set to 0, this indicates that the lock setting is disabled, whereas if the color setting parameters lock information 1714 is set to 1, this indicates that the lock setting is enabled. In the present embodiment, "lock the color setting parameters" is intended to mean "inhibit the color settings from being changed in a case where the exported color setting parameters are imported.

FIG. 8 is an explanatory diagram of a data structure 1800 of the color setting file 1230 generated by the computer apparatus 1000 shown in FIG. 3 so as to collectively set the color settings of the other computer apparatus 1000. The color setting file 1230 records the settings of the plurality of color setting items for printing by the printer 2000 in the data structure 1800 shown in FIG. 8. The position where the settings of the plurality of setting items are recorded in the color setting file 1230 is designated by an address 1801 and a size 1802, and are entered in rows under the column of contents 1803. The address 1801 and the size 1802 may be set in advance but may be variably specified based on definition data. Here, the address 1801 indicates a position where the head of each setting is stored in the file. The size 1802 indicates the size of an area storing each setting in the file. When the export button 1506 on the color setting screen 1500 is operated, the UI processor 1220 stores the settings of the color setting parameters 1709 to 1713 included in the DEVMODE 1330 in the color setting file 1230.

The color setting file 1230 having the data structure 1800 shown in FIG. 8 stores a setting 1804 of the intensity of the red color in a size of 1 byte from an address 0000. The color setting file 1230 stores a setting 1805 of the intensity of the green color in a size of 1 byte from an address 0001. The color setting file 1230 stores a setting 1806 of the intensity of the blue color in a size of 1 byte from an address 0002. The color setting file 1230 stores a setting 1807 of the intensity of brightness in a size of 1 byte from an address 0003. The color setting file 1230 stores a setting 1808 of the intensity of contrast in a size of 1 byte from an address 0004. The color setting file 1230 stores a setting 1809 of the color setting parameters lock information in a size of 1 byte from an address 0005. The color setting file 1230 stores a login name 1810 as user information in a size of 20 bytes from an address 0006. The login name is defined to be formed by using small letter one-byte alphanumeric characters within 20 characters. Note that the color setting file 1230 is only required to basically include the settings of the plurality of color setting items for printing. Therefore, the setting 1809 of the color setting parameters lock information or the login name 1810 can be excluded from the color setting file 1230. Further, the order of the settings of the plurality of setting items and the size of each setting item may be different from the above-described order and size.

Figure 9:
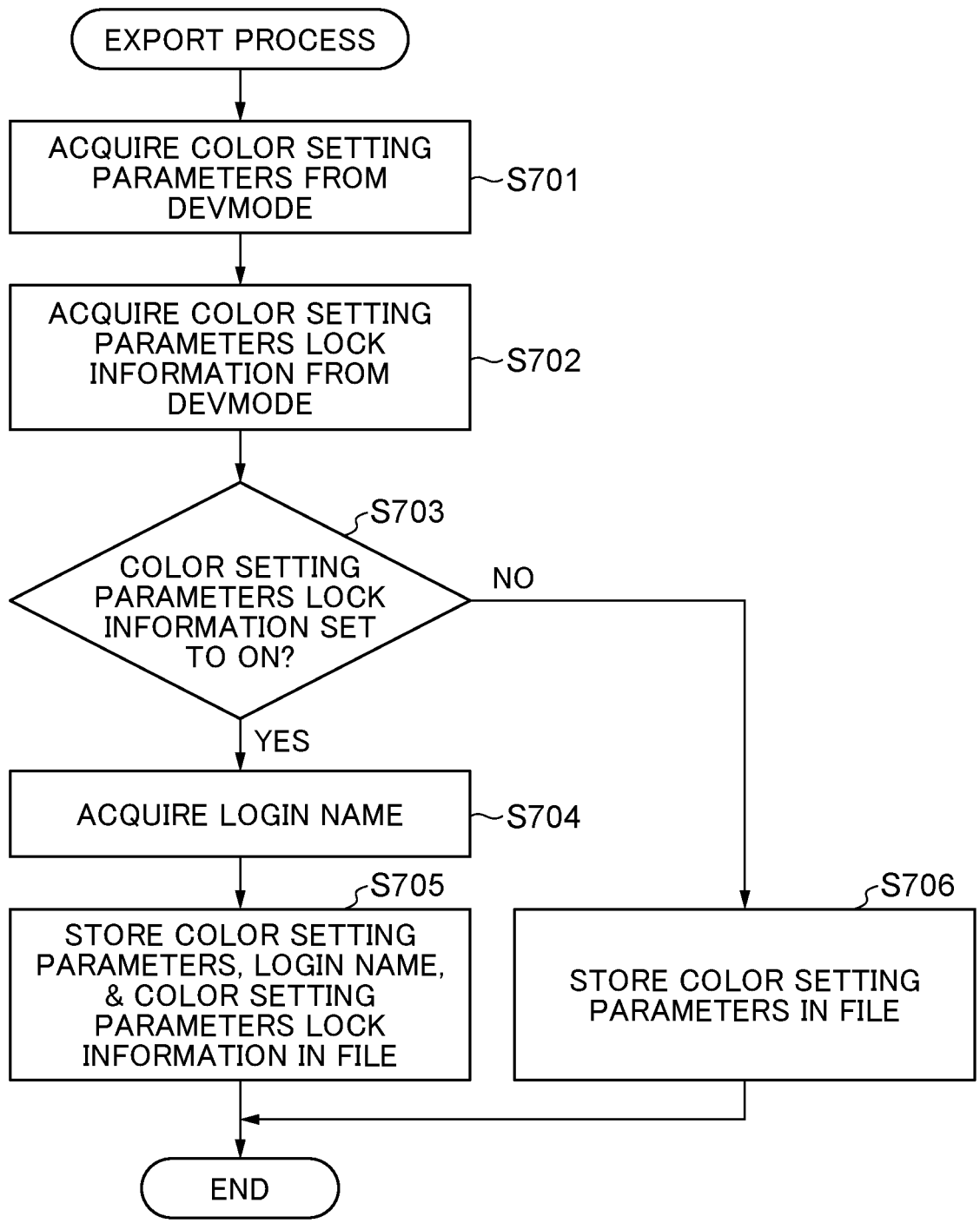
FIG. 9 is a flowchart of an export process, performed by the computer apparatus, for generating a color setting file, by operating an export button on the setting screen for color settings, which is shown in FIG. 6B.

FIG. 9 is a flowchart of an export process, performed by the computer apparatus 100, for generating the color setting file 1230, by operating the export button 1506 on the color setting screen 1500 shown in FIG. 6B. The CPU 1041 of the computer apparatus 1000 executes the export process in FIG. 9 as the printer driver 1200.

In a step S701, the CPU 1041 acquires the color setting parameters from the DEVMODE 1330 managed by the OS 1300 as the settings of the plurality of color setting items, which are to be stored in the color setting file 1230. In a step S702, the CPU 1041 acquires the color setting parameters lock information 1714 from the DEVMODE 1330 as lock setting information to be stored in the color setting file 1230. The color setting parameters lock information has a setting set based on an operation performed with respect to the check box 1508 on the color setting screen 1500. In a step S703, the CPU 1041 determines whether or not the acquired color setting parameters lock information 1714 is set to 1 that enables the lock setting (ON). If the lock setting is enabled (ON), the CPU 1041 proceeds to a step S704. If the lock setting is disabled (OFF), the CPU 1041 proceeds to a step S706. In the step S704, the CPU 1041 acquires the login name from the OS as the information of the user using the computer apparatus 1000. In a step S705, the CPU 1041 as an output unit stores a variety of types of information acquired so far in the color setting file 1230. The CPU 1041 stores the color setting parameters as the settings of the plurality of color setting items, the color setting parameters lock information 1714, and the login name, in the color setting file 1230, followed by terminating the present process. On the other hand, the step S706 is processing executed in a case where the lock setting is disabled (OFF). The CPU 1041 as the output unit stores a variety of types of information acquired so far in the color setting file 1230. In this case, the CPU 1041 stores the color setting parameters as the settings of the plurality of color setting items in the color setting file 1230, followed by terminating the present process.

With this, the CPU 1041 as the output unit can store the settings of the plurality of color setting items, which are set for the printer 2000 by the computer apparatus 1000, in the color setting file 1230 and output them. The color setting file 1230 can be acquired from the other computer apparatus 1000 via the network communication section 1050. Further, in a case where the lock setting is set for the plurality of setting items or for the plurality of settings, in the computer apparatus 1000, the CPU 1041 as a control unit can cause the setting of the lock setting to be included in the color setting file 1230. Further, in a case where a user using the computer apparatus 1000 has logged in, the CPU 1041 as the control unit can cause the information of the logged-in user to be included in the color setting file 1230 together with the setting of the lock setting. Note that the CPU 1041 may store settings of a plurality of setting items other than color settings in the color setting file 1230 and output them. Further, the CPU 1041 may store and output the color setting file 1230 in which the setting of lock setting and the information of the logged-in user are not included.

Figure 10:
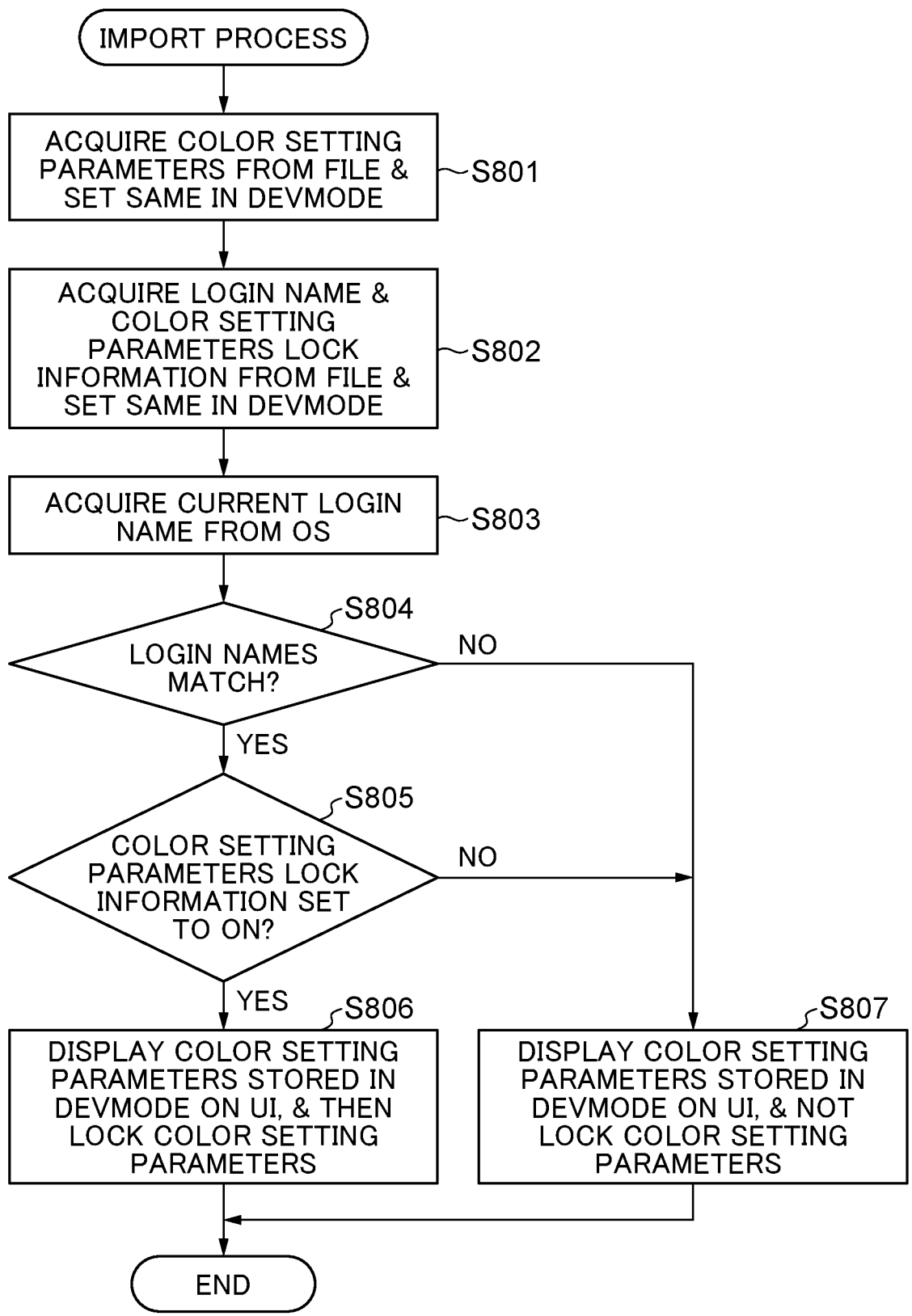
FIG. 10 is a flowchart of an import process, performed by the other computer apparatus, for acquiring the color setting file, by operating an import button on the setting screen for color settings, shown in FIG. 6B.

FIG. 10 is a flowchart of an import process for acquiring the color setting file 1230 that was generated and output by the computer apparatus 1000 different from the other computer apparatus 1000 by operating the import button 1507 on the color setting screen 1500, shown in FIG. 6B, on the other computer apparatus 1000. Here, the other computer apparatus 1000 refers to the second computer apparatus 1000B in a case where the color setting file 1230 was generated and output by the first computer apparatus 1000A appearing in FIG. 1. The CPU 1041 of the other computer apparatus 1000 executes the import process in FIG. 10 as the printer driver 1200. Note that in the following description of the present process, the computer apparatus 1000 that generates and outputs the color setting file 1230 is the first computer apparatus 1000A, and the other computer apparatus 1000 is the second computer apparatus 1000B. Further, in a case where the respective components are distinguished between the first and second computer apparatuses 1000A and 1000B, each component of the first computer apparatus 1000A has a suffix A added to reference numeral thereof, and each component of the second computer apparatus 1000B has a suffix B added to reference numeral thereof, as in the cases of the color setting file 1230A and the CPU 1041B, given by way of example.

In a step S801, the CPU 1041B of the second computer apparatus 1000B acquires the color setting parameters as the settings of the plurality of color setting items from the color setting file 1230A of the first computer apparatus 1000A via the network communication section 1050B and sets the acquired parameters in the DEVMODE 1330B of the second computer apparatus 1000B. In a step S802, the CPU 1041B acquires the login name as the user information and the color setting parameters lock information 1714 from the above-mentioned color setting file 1230A and sets the acquired information in the DEVMODE 1330B. In a step S803, the CPU 1041B acquires the login name of the user who is currently using the second computer apparatus 1000B from the OS 1300B of the second computer apparatus 1000B. In a step S804, the CPU 1041B determines whether or not the login name acquired in the step S802 and the login name acquired in the step S803 match each other. If the login names match each other, the CPU 1041B proceeds to a step S805. If the login names do not match each other, the CPU 1041B proceeds to a step S807. In the step S805, the CPU 1041B determines whether or not the lock setting is enabled (ON) in the acquired color setting parameters lock information 1714. If the lock setting is enabled (ON), the CPU 1041B proceeds to a step S806. If the lock setting is disabled (OFF), the CPU 1041B proceeds to the step S807. In the step S806, the CPU 1041B displays the color setting parameters as the settings of the plurality of color setting items, set in the DEVMODE 1330B, on the display section 1010B. Further, the CPU 1041B locks the settings such that the settings are inhibited from being changed by an operation on the console section 1020B. In a case where the settings are locked, the CPU 1041B displays the settings on the console section 1020B but prevents each of associated areas displaying the settings, respectively, from accepting an input from the user. The area for inputting a setting of each locked setting item may be grayed out. After that, the CPU 1041B terminates the present process. On the other hand, the step S807 is executed in the case where the login names do not match each other, or in the case where the lock setting is disabled (OFF). The CPU 1041B displays the color setting parameters as the settings of the plurality of color setting items, which were set in the DEVMODE 1330B, on the display section 1010B. Then, the CPU 1041B terminates the present process.

With this, the CPU 1041B of the second computer apparatus 1000B, as an acquisition unit, acquires the settings of the plurality of color setting items, which were set in the first computer apparatus 1000A in advance, from the color setting file 1230A of the first computer apparatus 1000A. Further, the CPU 1041B can set the acquired settings in the DEVMODE 1330B. Further, the CPU 1041B as a lock determination unit can determine whether or not the lock setting for inhibiting the settings of the plurality of color setting items from being changed is included in the information of the acquired color setting file 1230A. Then, in a case where the lock setting is included, the CPU 1041B as the control unit can inhibit the settings of the plurality of setting items, associated with the lock setting, from being changed by an operation on the console section 1020B. Note that in a case where the color setting file 1230A includes settings of a plurality of setting items associated with other than color and information of the lock setting of these settings, the CPU 1041B may also inhibit the settings of the other setting items from being changed by an operation on the console section 1020B. Further, the CPU 1041B may execute only one of the determination processing operations in the step S804 and the step S805. Further, the CPU 1041B may necessarily execute the step S806 when settings of a plurality of setting items are acquired from the color setting file 1230A and set in the DEVMODE 1330B.

FIG. 11 is an explanatory diagram of contents of user's favorite settings 1900, stored in the other computer apparatus 1000. The contents of the favorite settings 1900 shown in FIG. 11 may be recorded in the storage section 1030 or the memory 1042 of the other computer apparatus 1000. The favorite settings 1900 are collectively set in the DEVMODE 1330 of the other computer apparatus 1000 by a login operation or a print setting operation of a user, which is performed on the console section 1020 of the other computer apparatus 1000. The favorite settings 1900 includes the settings of the plurality of setting items for printing, set for the other printer 2000 connected to the other computer apparatus 1000 or for the other printer driver 1200 associated with the other printer 2000. The favorite settings 1900 shown in FIG. 11 includes the settings of the plurality of setting items for printing, shown in FIG. 7, for printing by the other printer 2000, which are managed and stored by the DEVMODE 1330 of the other computer apparatus 1000. Further, in FIG. 11, a plurality of sets of favorite settings, such as a standard settings set 1902 and a 2 in 1 settings set 1903, are indicated on a column basis. The plurality of favorite settings sets 1902 and 1903 are a plurality of sets of favorite settings which can be used by a user having logged into the other computer apparatus 1000. The standard settings set 1902 of favorite settings is a preset settings set. The 2 in 1 settings set 1903 of favorite settings is a settings set generated by the user who operated the console section 1020 e.g. of the other computer apparatus 1000. When the standard settings set 1902 is selected, the CPU 1041 of the other computer apparatus 1000 basically collectively sets the settings of the plurality of setting items included in the standard settings set 1902 in the DEVMODE 1330 of the other computer apparatus 1000. When the 2 in 1 settings set 1903 is selected, the CPU 1041 of the other computer apparatus 1000 basically collectively sets the settings of the plurality of setting items included in the 2 in 1 settings set 1903 in the DEVMODE 1330 of the other computer apparatus 1000. Let it be assumed that the current settings of document size 1402, number of copies 1404, and page layout 1405, appearing in FIG. 6A, are set to A3, 100, and 1 in 1, respectively. If the 2 in 1 settings set 1903 is selected in this state, the settings of document size 1402, number of copies 1404, and page layout 1405 are collectively changed to A4, 1, and 2 in 1, respectively. However, in a case where the lock setting is set with respect to the plurality of color setting items set in the DEVMODE 1330 of the other computer apparatus 1000, the CPU 1041 prevents some or all of the selected set of favorite settings from being collectively set. This makes it possible to prevent the settings of the plurality of color setting items, set by the user using the color setting file 1230, from being carelessly changed by application of the set of favorite settings. The user can collectively set the settings of the plurality of setting items of the selected set of favorite settings for the other computer apparatus 1000 by selecting and operating one of the plurality of favorite settings sets 1902 and 1903.

Figure 12:
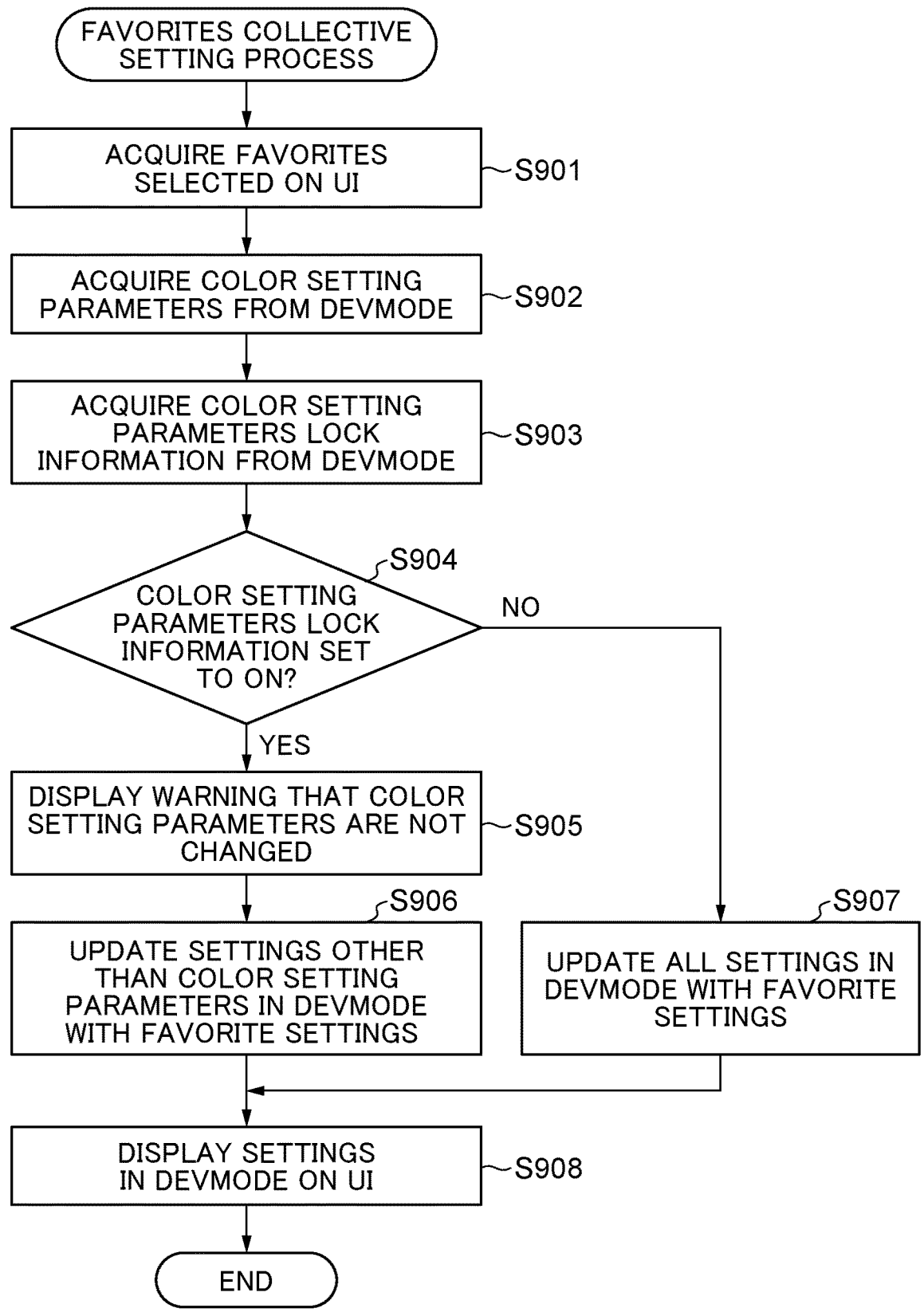
FIG. 12 is a flowchart of a favorites collective setting process performed by the other computer apparatus, for collectively setting favorites, in response to an operation for setting the favorites.

FIG. 12 is a flowchart of a favorites collective setting process, performed when an operation for setting the favorites 1401 is performed on the other computer apparatus 1000 (second computer apparatus 1000B). Note that also in the description of the present process, similar to the description of the import process in FIG. 10, the suffix A is added to reference numeral of each component of the first computer apparatus 1000A, and the suffix B is added to reference numeral of each component of the second computer apparatus 1000B. When the setting of the display object of favorites 1401 is selected on the print setting screen 1400 shown in FIG. 6A, the CPU 1041B of the second computer apparatus 1000B executes, as the printer driver 1200B, the favorites collective setting process in FIG. 12. In a case where the user has logged into the second computer apparatus 1000B, the plurality of favorite settings sets 1902 and 1903, which can be used by the logged-in user, are selectably displayed on the print setting screen 1400 shown in FIG. 6A.

In a step S901, the CPU 1041B of the second computer apparatus 1000B acquires the favorite settings selected on the print setting screen 1400 shown in FIG. 6A. In a step S902, the CPU 1041B acquires the color setting parameters as the settings of the plurality of color setting items from the DEVMODE 1330B. In a step S903, the CPU 1041B acquires the color setting parameters lock information 1714 as the information of the lock setting from the DEVMODE 1330B. In a step S904, the CPU 1041B determines whether or not the acquired color setting parameters lock information 1714 enables the lock setting (ON). If the acquired color setting parameters lock information 1714 enables the lock setting (ON), the CPU 1041B proceeds to a step S905. If the acquired color setting parameters lock information 1714 disables the lock setting (OFF), the CPU 1041B proceeds to a step S907.

In the step S905, the CPU 1041B displays a warning screen on the display section 1010B of the second computer apparatus 1000B, for notifying the user that the settings of the color setting items, associated with the lock setting, are not changed by collective setting of the selected favorite settings. In a case where the lock setting is included, the CPU 1041B as the control unit outputs and displays the warning screen on the display section 1010B, which indicates that the settings of the plurality of setting items or the plurality of settings, associated with the lock setting, are inhibited from being changed when the console section 1020B is operated. When an OK button on the warning screen is operated, for example, the CPU 1041B proceeds to a step S906. In the step S906, the CPU 1041B updates settings other than the settings of the color setting items, associated with the lock setting, out of the settings of the plurality of setting items set in the DEVMODE 1330B, by collective setting of the selected favorite settings. More specifically, although the print settings as indicated by the favorite settings are set in the DEVMODE 1330B, at this time, the color setting parameters are not changed from the current settings. For example, in a case where the current setting of brightness is 50, even when the 2 in 1 settings set 1903 as a favorite settings set is selected for operation, the setting of brightness is held at 50 but not changed. After that, the CPU 1041B proceeds to a step S908.

The step S907 is executed in a case where the lock setting for the settings of the color setting items is disabled. The CPU 1041B updates all of the settings of the plurality of setting items in the DEVMODE 1330B including the settings of the color setting items, which can be locked, by collective setting of the selected favorite settings. More specifically, the print settings indicated by the favorite settings are set in the DEVMODE 1330B. For example, in a case where the current setting of brightness is 50, when the 2 in 1 settings set 1903 as a favorite settings set is selected for operation, the setting of brightness is changed to 0. After that, the CPU 1041B proceeds to the step S908. In the step S908, the CPU 1041B displays the updated settings of the plurality of setting items of the DEVMODE 1330B on the display section 1010B of the second computer apparatus 1000B for confirmation.

With this, in a case where the lock setting for the plurality of color setting items is included, the CPU 1041B of the second computer apparatus 1000B as the control unit can inhibit the settings of the plurality of setting items, associated with the lock setting, from being changed by an operation on the console section 1020B. Even when a favorite settings set is selected for operation on the console section 1020B, the CPU 1041B can prevent the settings of the plurality of setting items or the plurality of settings, associated with the lock setting, from being changed. Note that in a case where the lock setting for the settings of a plurality of setting items other than color settings is included, the CPU 1041B of the second computer apparatus 1000B may inhibit the settings of the plurality of setting items, associated with the lock setting, from being changed by an operation on the console section 1020B. Further, in a case where the lock setting is included in the DEVMODE 1330B, the CPU 1041B may inhibit the settings from being changed by collective setting of the favorite settings. The CPU 1041B may inhibit at least the plurality of setting items or the plurality of settings, associated with the lock setting, from being changed by an operation on the console section 1020B. Further, in a case where the settings are collectively updated according to the favorite settings, the CPU 1041B may necessarily display a warning to the effect that the settings of the plurality of setting items, associated with the lock setting, are not collectively changed regardless of the color setting parameters lock information. In a case where the color setting parameters lock information is enabled, the CPU 1041B may prevent the color setting parameters from being changed.

Further, in the import process in FIG. 10, in a case where the login name of a user who has caused the color setting file 1230A to be read and the login name of a user having logged into the second computer apparatus 1000B do not match each other, the lock setting is disabled (OFF). In this case, in the favorites collective setting process in FIG. 12, the CPU 1041B executes the step S907. In a case where another user different from the login name included in the color setting file 1230A reads the file, the CPU 1041B can collectively change all of the settings, including the settings of the color setting items, associated with the lock setting, in the favorites collective setting process in FIG. 12.

Figure 13:
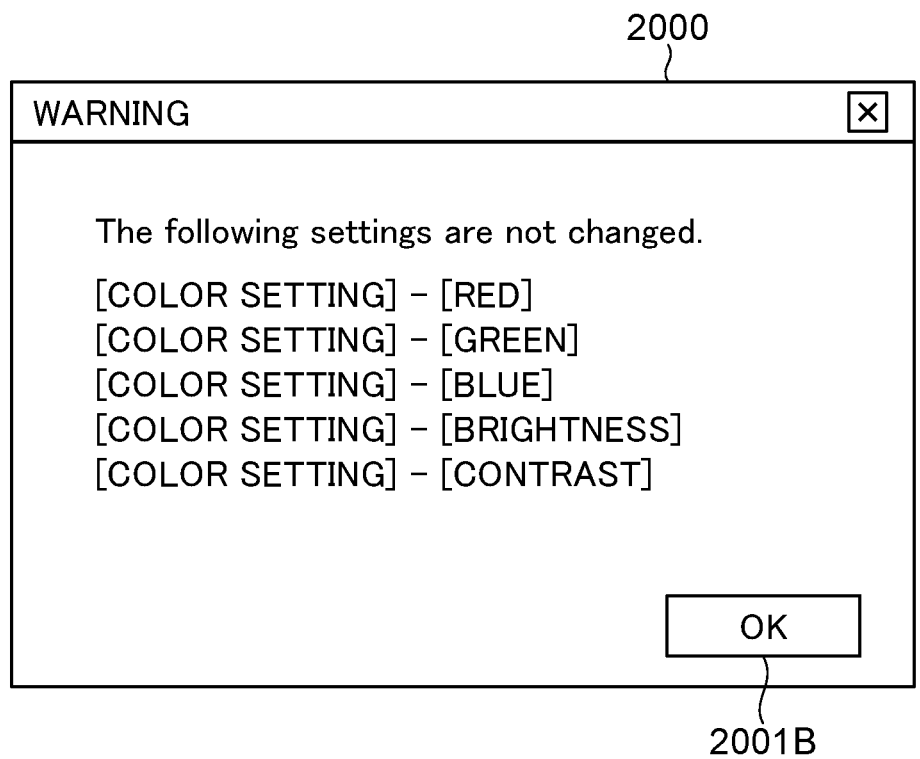
FIG. 13 is an explanatory diagram of a warning screen, displayed by the other computer apparatus in the process in FIG. 12, for notifying that settings of color setting parameters are not to be changed.

FIG. 13 is an explanatory diagram of the warning screen indicating that the settings of color setting parameters are not changed, which is displayed in the favorites collective setting process in FIG. 12 by the other computer apparatus 1000 (second computer apparatus 1000B). The CPU 1041B displays the warning screen shown in FIG. 13 e.g. in the step S905 in FIG. 12. The warning screen shown in FIG. 13 includes a warning message to the effect that the color setting parameters as the settings of the plurality of color setting items are not updated by collective setting of the set of favorite settings. Then, when an OK button 2001B on the warning screen shown in FIG. 13 is operated, the CPU 1041B proceeds from the step 905 to the step S906 in FIG. 12, for example.

As described above, in the present embodiment, the other computer apparatus 1000 as the information processing apparatus acquires the information of the color setting file 1230, set in advance. Further, the other computer apparatus 1000 determines whether or not lock setting for inhibiting a plurality of setting items or a plurality of settings from being changed is included in the acquired information. Then, if it is determined that the lock setting is included, the other computer apparatus 1000 inhibits the settings of the plurality of setting items or the plurality of settings, associated with the lock setting, from being changed by an operation on the console section 1020. If the lock setting is included in the acquired information, even when the console section 1020 is operated to collectively set the favorite settings, the other computer apparatus 1000 can prevent at least the settings of the plurality of setting items, associated with the lock setting, from being changed. Therefore, the settings of the plurality of setting items, set by using the color setting file 1230, are prevented from being carelessly collectively changed by operating the console section 1020 of the other computer apparatus 1000. The other computer apparatus 1000 can perform processing for printing, including the image processing, based on the settings made when the color setting file 1230 was generated in advance, even when the console section 1020 is operated. The other computer apparatus 1000 gives the priority to the settings made when the color setting file 1230 was generated in advance and can perform processing for printing, including the image processing, based on the settings.

Particularly, in the present embodiment, based on the lock setting, at least the settings of the plurality of setting items or the plurality of settings, associated with the lock setting, are inhibited from being collectively changed by operating the console section 1020. With this, in the present embodiment, it is possible to perform processing for printing, including the image processing, which was intended in the computer apparatus 1000 previously used before the other computer apparatus 1000 is newly used by the user. The plurality of computer apparatuses 1000 are enabled to always execute processing for printing, including the image processing, with the same settings based on the information of the color setting file 1230 acquired according to an instruction of the user. On the other hand, if settings set by a user are just restricted based on a lock setting, the settings of the setting items, associated with the lock setting, can be collectively updated with the other settings within a range of the restriction when the user operates the console section 1020 after that. For example, in a case where predetermined favorite settings are collectively set when the user performs an login operation by operating the console section 1020 of the other computer apparatus 1000, the settings of the setting items, associated with the lock setting, can be collectively updated together with the other settings. In the present embodiment, it is possible to inhibit the settings from being changed by collective setting. In the present embodiment, it is possible to prevent the settings from being carelessly changed by collective setting, which is not intended by a user.

The above-described embodiment shows the example of collectively setting the color settings of the second computer apparatus 1000B to the same color settings as those of the first computer apparatus 1000A, using the color setting file 1230. Further, for example, the setting items associated with the lock setting set in the first computer apparatus 1000A in advance may be other setting items for printing, or setting items for image processing other than printing. By acquiring this file including the lock setting for the setting items, the second computer apparatus 1000B can collectively set the settings and inhibit the update of the thus set setting items or settings. For example, the setting items, associated with the lock setting, may be all setting items set by the first computer apparatus 1000A for the first printer 2000A. The file may include an unnecessary setting item for a combination of the second computer apparatus 1000B and the second printer 2000B and the lock setting for the unnecessary setting item. In this case, even when the lock setting for the unnecessary setting item is included in the file, the second computer apparatus 1000B may treat the file as a file in which the lock setting is not included. The lock setting may be included in the file as an individual setting set for each setting item or each setting, or as a collective setting set with respect to a plurality of setting items or a plurality of settings.

In the above-described embodiment, in a case where the lock setting is set for the settings of a plurality of setting items which are to be acquired from a file and collectively set, the second computer apparatus 1000B inhibits the update of the settings of the plurality of setting items associated with the lock setting. The second computer apparatus 1000B does not update the settings of the plurality of setting items associated with the lock setting in the collective setting process performed according to the favorite settings. Further, in the second computer apparatus 1000B, an operation for individually setting each setting of the plurality of setting items for printing, for the second printer 2000B, can be performed. In this case, the second computer apparatus 1000B may inhibit or permit changing the settings of the setting items collectively set together with the lock setting, by individual setting. Further, in a case where any of the settings of the plurality of setting items collectively set together with the lock setting is changed by one individual setting in conjunction therewith, the second computer apparatus 1000B may inhibit or permit changing this setting. In the case of permitting changing any of the settings of the setting items collectively set together with the lock setting by individual setting, the second computer apparatus 1000B may display a warning screen about the change of the settings of the setting items collectively set together with the lock setting of the file.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209348, filed Dec. 17, 2020, which is hereby incorporated by reference herein in its entirety.

What is claimed is:

1. An information processing apparatus, comprising:
a user interface unit that is operated so as to set settings of a plurality of setting items in the information processing apparatus;
a storage section that is capable of storing settings, set by a user, of a plurality of setting items for color setting of an image processing apparatus to be used, such that the settings can be collectively set,
at least one processor, and
a memory coupled to the at least one processor, the memory having instructions that, when executed by the processor, perform the operations as:
an acquisition unit configured to acquire information including settings of the plurality of setting items for color setting of the image processing apparatus;
a lock determination unit configured to determine whether or not a lock setting for inhibiting the plurality of setting items or a plurality of settings for color setting from being changed is included in the information acquired by the acquisition unit; and
a control unit configured to inhibit, in a case where it is determined by the lock determination unit that the lock setting is included, at least the plurality of color setting items for color setting of the image processing apparatus from being changed by operating the user interface unit.

2. The information processing apparatus according to claim 1, wherein the user interface unit is configured to be capable of performing an operation for collectively setting settings of the plurality of setting items, and
wherein in a case where the lock setting is included in the information acquired by the acquisition unit, even when an operation for collective setting is performed on the user interface unit, the control unit causes at least the plurality of setting items or the plurality of settings, associated with the lock setting, to be inhibited from being changed.

3. The information processing apparatus according to claim 1, wherein in a case where the lock setting is included in the information acquired by the acquisition unit, when the user interface unit is operated, the control unit at least causes a warning screen notifying that the plurality of setting items or the plurality of settings, associated with the lock setting, are inhibited from being changed, to be output to the user interface unit.

4. The information processing apparatus according to claim 1, wherein in a case where it is determined by the lock determination unit that the lock setting is included, and at the same time, user information which can be included in the information acquired by the acquisition unit and a user who is using the information processing apparatus match each other, the control unit inhibits at least the plurality of setting items or the plurality of settings, associated with the lock setting, from being changed by operating the user interface unit.

5. The information processing apparatus according to claim 1, wherein the at least one processor is configured to further preform the operations as:
an output unit configured to output settings of the plurality of setting items set in the information processing apparatus as a file which can be acquired by the acquisition unit,
wherein in a case where a lock setting for the plurality of setting items or a plurality of settings exists in the information processing apparatus when the output unit outputs the file, the control unit causes the lock setting to be included in the file to be output by the output unit.

6. The information processing apparatus according to claim 1, wherein in a case where a user who uses the information processing apparatus has logged in when the output unit outputs the file, the control unit causes information of the logged-in user to be included in the file output by the output unit.

7. A method of controlling an information processing apparatus including a user interface unit that is operated so as to set settings of a plurality of setting items in the information processing apparatus, comprising:
storing settings, set by a user, of a plurality of setting items for color setting of an image processing apparatus to be used, such that the settings can be collectively set;
acquiring information including settings of the plurality of setting items for color setting of the image processing apparatus;
determining whether or not a lock setting for inhibiting the plurality of setting items or a plurality of settings for color setting from being changed is included in the acquired information; and
inhibiting, in a case where it is determined that the lock setting is included, at least the plurality of color setting items for color setting of the image processing apparatus from being changed by operating the user interface unit.

8. A non-transitory computer-readable storage medium storing a program for causing a computer to execute a method of controlling an information processing apparatus including a user interface unit that is operated so as to set settings of a plurality of setting items in the information processing apparatus,
wherein the method comprises:
storing settings, set by a user, of a plurality of setting items for color setting of an image processing apparatus to be used, such that the settings can be collectively set;
acquiring information including settings of the plurality of setting items for color setting of the image processing apparatus;
determining whether or not a lock setting for inhibiting the plurality of setting items or a plurality of settings for color setting from being changed is included in the acquired information; and inhibiting, in a case where it is determined that the lock setting is included, at least the plurality of color setting items for color setting of the image processing apparatus from being changed by operating the user interface unit.

\* \* \* \* \*